US012599898B2

(12) United States Patent
De Silva et al.

(10) Patent No.: US 12,599,898 B2
(45) **Date of Patent: \*Apr. 14, 2026**

(54) FLUID CATALYTIC CRACKING CATALYST COMPOSITION FOR ENHANCED BUTYLENES YIELDS WITH METAL PASSIVATION FUNCTIONALITY

(71) Applicant: BASF CORPORATION, Florham Park, NJ (US)

(72) Inventors: Wathudura Indika Namal De Silva, Iselin, NJ (US); David M. Stockwell, Iselin, NJ (US); Gary M. Smith, Iselin, NJ (US); Vasileios Komvokis, Iselin, NJ (US); Bilge Yilmaz, Iselin, NJ (US)

(73) Assignee: BASF CORPORATION, Florham Park, NJ (US)

( * ) Notice: Subject to any disclaimer, the term of this patent is extended or adjusted under 35 U.S.C. 154(b) by 316 days.

This patent is subject to a terminal disclaimer.

(21) Appl. No.: 18/020,188

(22) PCT Filed: Aug. 18, 2021

(86) PCT No.: PCT/US2021/046489
§ 371 (c)(1),
(2) Date: Feb. 7, 2023

(87) PCT Pub. No.: WO2022/040303
PCT Pub. Date: Feb. 24, 2022

(65) Prior Publication Data
US 2023/0294083 A1     Sep. 21, 2023

Related U.S. Application Data

(60) Provisional application No. 63/067,607, filed on Aug. 19, 2020.

(51) Int. Cl.
B01J 21/02         (2006.01)
B01J 21/04         (2006.01)
(Continued)

(52) U.S. Cl.
CPC .............. B01J 29/80 (2013.01); B01J 21/04 (2013.01); B01J 21/12 (2013.01); B01J 21/16 (2013.01);
(Continued)

(58) Field of Classification Search
CPC ... B01J 21/12; B01J 21/16; B01J 27/16; B01J 29/088; B01J 29/80; B01J 29/405;
(Continued)

(56) References Cited

U.S. PATENT DOCUMENTS

| 5,082,814 A | * | 1/1992 | Stockwell | ............ | B01J 37/0215 |
| | | | | | 502/68 |
| 5,228,980 A | * | 7/1993 | Stockwell | .............. | B01J 29/084 |
| | | | | | 502/68 |

(Continued)

FOREIGN PATENT DOCUMENTS

| CN | 1566274 A | 1/2005 |
| CN | 105013525 A | 11/2015 |

(Continued)

OTHER PUBLICATIONS

International Search Report and Written Opinion of International Application No. PCT/US2021/046489 mailed Jan. 21, 2022, 10 pgs.

(Continued)

*Primary Examiner* — Cam N. Nguyen
(74) *Attorney, Agent, or Firm* — Peter DiMauro

(57) ABSTRACT

Disclosed herein is a fluid catalyst cracking (FCC) catalyst composition that includes a first component and a second component. The first component includes zeolite Y and a first matrix that includes a metal passivating constituent. The
(Continued)

Crystalline Boehmite Crystallite 110

Crystalline Boehmite Agglomerate 120

Dispersion

Crystalline Boehmite Solid 130 second component includes beta zeolite and a second matrix. Also disclosed herein are methods of preparing the FCC catalyst composition and method of using the FCC catalyst composition.

21 Claims, 2 Drawing Sheets

(51) Int. Cl.

| | |
|---|---|
| *B01J 21/08* | (2006.01) |
| *B01J 21/12* | (2006.01) |
| *B01J 21/16* | (2006.01) |
| *B01J 23/755* | (2006.01) |
| *B01J 27/06* | (2006.01) |
| *B01J 27/16* | (2006.01) |
| *B01J 29/08* | (2006.01) |
| *B01J 29/40* | (2006.01) |
| *B01J 29/70* | (2006.01) |
| *B01J 29/80* | (2006.01) |
| *B01J 35/40* | (2024.01) |
| *B01J 35/61* | (2024.01) |
| *B01J 37/00* | (2006.01) |
| *B01J 37/04* | (2006.01) |
| *B01J 37/28* | (2006.01) |
| *C10G 11/05* | (2006.01) |
| *B01J 29/06* | (2006.01) |

(52) U.S. Cl.

CPC ............. *B01J 27/16* (2013.01); *B01J 29/088* (2013.01); *B01J 29/405* (2013.01); *B01J 29/7057* (2013.01); *B01J 35/613* (2024.01); *B01J 35/615* (2024.01); *B01J 37/0018* (2013.01); *B01J 37/04* (2013.01); *C10G 11/05* (2013.01); *B01J 2029/062* (2013.01); *C10G 2300/1044* (2013.01); *C10G 2400/02* (2013.01); *C10G 2400/20* (2013.01); *C10G 2400/22* (2013.01); *C10G 2400/30* (2013.01)

(58) Field of Classification Search

CPC .... B01J 29/7057; B01J 35/613; B01J 35/615; B01J 37/0018; B01J 37/04; B01J 21/04; B01J 2029/062; B01J 21/02; B01J 35/19; B01J 35/40; B01J 37/0045; B01J 2229/36; B01J 21/08; B01J 23/755; B01J 29/084; B01J 29/40; B01J 29/7007; B01J 38/06; B01J 37/28; C10G 11/05; C10G 2300/1044; C10G 2400/02; C10G 2400/20; C10G 2400/22; C10G 2400/30

USPC ......................................................... 502/79

See application file for complete search history.

(56) References Cited

U.S. PATENT DOCUMENTS

| | | | | |
|---|---|---|---|---|
| 5,314,612 A | | 5/1994 | Eberly et al. | |
| 5,324,416 A | * | 6/1994 | Cormier ................. | C10G 11/05 208/120.25 |
| 5,371,055 A | * | 12/1994 | Cormier ................. | B01J 21/005 502/64 |
| 5,559,067 A | * | 9/1996 | Lerner ................... | C10G 11/05 502/64 |
| 6,399,530 B1 | * | 6/2002 | Chen ...................... | B01J 23/883 502/313 |
| 6,524,470 B1 | | 2/2003 | Kasztelan et al. | |
| 6,656,347 B2 | * | 12/2003 | Stockwell ........... | B01J 37/0246 502/64 |
| 6,673,235 B2 | | 1/2004 | Harris et al. | |
| 6,696,378 B2 | * | 2/2004 | Gibson ................ | B01J 37/0045 502/64 |
| 6,716,338 B2 | | 4/2004 | Madon et al. | |
| 6,942,784 B2 | * | 9/2005 | Stockwell .............. | B01J 29/084 502/79 |
| 6,943,132 B2 | * | 9/2005 | Stockwell .............. | B01J 29/084 502/64 |
| 7,375,048 B2 | * | 5/2008 | Smith ...................... | B01J 29/06 502/64 |
| 7,547,813 B2 | * | 6/2009 | Smith ...................... | B01J 29/40 585/653 |
| 8,278,235 B2 | * | 10/2012 | Stockwell .............. | B01J 29/084 502/64 |
| 8,372,772 B2 | * | 2/2013 | Stockwell .............. | B01J 29/064 502/79 |
| 8,940,652 B2 | * | 1/2015 | Fu ........................... | B01J 37/04 502/79 |
| 9,108,181 B2 | * | 8/2015 | Stockwell ................ | B01J 21/16 |
| 9,441,167 B2 | * | 9/2016 | McGuire, Jr. ........... | B01J 35/19 |
| 9,637,688 B2 | | 5/2017 | Fu et al. | |
| 9,675,967 B2 | * | 6/2017 | Stockwell .............. | B01J 29/084 |
| 9,796,932 B2 | * | 10/2017 | Smith ...................... | B01J 37/28 |
| 9,895,680 B2 | * | 2/2018 | McGuire, Jr. .......... | C10G 11/18 |
| 10,086,367 B2 | * | 10/2018 | Smith .................. | B01J 23/8472 |
| 10,130,943 B2 | * | 11/2018 | Karthikeyani ........... | C07C 4/06 |
| 10,525,451 B2 | * | 1/2020 | McGuire, Jr. .......... | B01J 29/084 |
| 10,633,596 B2 | | 4/2020 | Mcguire et al. | |
| 10,683,458 B2 | * | 6/2020 | Smith ...................... | B01J 37/04 |
| 11,254,878 B2 | * | 2/2022 | McGuire .............. | B01J 35/613 |
| 11,332,675 B2 | * | 5/2022 | Stockwell .............. | B01J 29/088 |
| 11,471,862 B2 | | 10/2022 | Wei et al. | |
| 11,498,054 B2 | * | 11/2022 | Smith ...................... | B01J 21/16 |
| 11,759,771 B2 | * | 9/2023 | Yilmaz .................. | B01J 20/041 208/118 |
| 11,827,853 B2 | * | 11/2023 | Stockwell .............. | B01J 35/633 |
| 11,904,302 B2 | * | 2/2024 | Wei ........................ | B01J 29/084 |
| 12,104,123 B2 | * | 10/2024 | Stockwell .............. | B01J 29/088 |
| 2013/0066131 A1 | * | 3/2013 | Harris ...................... | C07C 4/06 502/67 |
| 2014/0206526 A1 | | 7/2014 | Gao et al. | |
| 2017/0144137 A1 | | 5/2017 | Smith et al. | |
| 2018/0126365 A1 | | 5/2018 | Mcguire et al. | |
| 2020/0078774 A1 | | 3/2020 | Wei et al. | |
| 2020/0086304 A1 | | 3/2020 | Kuvettu et al. | |
| 2024/0091748 A1 | * | 3/2024 | Gao ........................ | B01J 21/12 |

FOREIGN PATENT DOCUMENTS

| | | | | |
|---|---|---|---|---|
| DE | 4114532 A1 | 11/1991 | | |
| EP | 0955093 A1 | 11/1999 | | |
| WO | 03/054114 A2 | 7/2003 | | |
| WO | 2012/096744 A2 | 7/2012 | | |
| WO | WO-2013077836 A1 | * 5/2013 | ......... | B01J 37/0205 |
| WO | 2015/094920 A1 | 6/2015 | | |
| WO | 2015094916 A1 | 6/2015 | | |
| WO | 2018183009 A1 | 10/2018 | | |
| WO | 2019118344 A1 | 6/2019 | | |

OTHER PUBLICATIONS

Partial European Search Report for EP Patent Application No. 21859051.1, Issued on Jul. 10, 2024, 4 pages.
Supplementary European Search Report for EP Patent Application No. 21859051.1, Issued on Oct. 15, 2024, 4 pages.
Office Action from United Arab Emirates (UAE) Patent Office, mailed Apr. 29, 2025, in matter of corresponding UAE Patent Application P6000381/2023.

* cited by examiner

Crystalline Boehmite Solid 130

Dispersion

Crystalline Boehmite Agglomerate 120

Crystalline Boehmite Crystallite 110

FLUID CATALYTIC CRACKING CATALYST COMPOSITION FOR ENHANCED BUTYLENES YIELDS WITH METAL PASSIVATION FUNCTIONALITY

CROSS-REFERENCE TO RELATED APPLICATION(S)

This application claims the benefit of priority of U.S. Provisional Patent Application No. 63/067,607, filed on Aug. 19, 2020, the disclosure of which is hereby incorporated by reference herein in its entirety.

FIELD OF THE DISCLOSURE

The present disclosure relates to petroleum refining catalysts and compositions thereof. In particular, the present disclosure relates to fluid catalytic cracking (FCC) catalysts and compositions thereof, methods of their preparation, and methods of their use.

BACKGROUND OF THE DISCLOSURE

FCC is the main source of world's butylenes production. Almost half of the butylenes production is sourced from FCC units, and more than 40% of it is consumed to make high octane blending components via alkylation units. Due to increasing demand for improved fuel efficiency, more and more refiners find it profitable to increase butylenes in their units. However, conventional olefin maximization additives based on ZSM-5 alone are not sufficient to meet this target. ZSM-5 additives are designed to make propylene; thus, they make more propylene over butylenes. When the units are wet-gas compressor limited the use of ZSM-5 will increase propylene more than butylenes, thus reaching the liquefied petroleum gas (LPG) limit constraints before reaching the required butylenes yields. In such a scenario the unit needs a catalyst (or additive) solution which contributes to increased butylenes/propylene (C4=/C3=) ratio compared to ZSM-5.

FCC feeds may contain contaminant metals including Ni, V, and others. Both Ni and V catalyze unwanted dehydrogenation reactions. Ni significantly increases hydrogen and coke yields. In addition to taking part in unwanted dehydrogenation reactions, V comes with other major concerns as it is highly mobile under FCC conditions and its interaction with the zeolite destroys the zeolite framework structure, which manifests itself as increased coke and hydrogen yields, as well as lower zeolite surface area retention. There is a need for a catalyst (or additive) solution which passivates and/or traps metal contaminants, such as Ni and V, reduces coke and hydrogen yields for a variety of FCC unit conditions and hydrocarbon feed, while still maintaining enhanced total butylenes yield and/or enhanced butylenes to propylene selectivity ratio.

SUMMARY OF THE DISCLOSURE

The present disclosure provides a fluid catalytic cracking (FCC) catalyst composition that includes a first component and a second component. The first component includes Y zeolite and a first matrix that includes a metal passivating constituent. The second component includes beta zeolite and a second matrix. The FCC catalyst compositions described herein include multiple zeolitic frameworks to deliver superior butylenes activity, butylenes yield, and butylenes selectivity, while passivating and/or trapping metal contaminants (such as Ni and/or V) and while maintaining constant or lower yields and selectivity for less desired products, such as hydrogen and coke.

At least one additional component that is compositionally different from the first component and from the second component may also be included in the FCC catalyst composition. In certain embodiments, the additional component may include boron oxide, a metal trap, or a combination thereof. In certain embodiments, the additional component may include a zeolite, which may be selected from ZSM-5, mordenite, ferrierite, MCM-22, MCM-68, Y zeolite, beta zeolite, or a combination thereof (though other zeolites may also be included in suitable additional components).

The first component may be present in the FCC catalyst composition in a greater amount than the second component. For instance, the weight to weight ratio of the first component to the second component in the FCC catalyst composition may range from about 20:1 to about 1.5:1, from about 15:1 to about 3:1, or from about 12:1 to about 5:1.

The first component includes Y zeolite (e.g., at least about 15 wt % Y-faujasite crystallized in-situ from a metakaolin-containing calcined microsphere) and a first matrix that includes a metal passivating constituent. The metal passivating constituent may include alumina obtained by the calcination of a dispersible boehmite, such as an alumina in a transitional gamma phase, delta phase, or a combination thereof. The first matrix may include, in addition to the alumina in the transitional phase, clay, rare earth-doped alumina (e.g., one or more of ytterbium-doped alumina, gadolinium-doped alumina, cerium-doped alumina, or lanthanum-doped alumina), $SiO_2$—$Al_2O_3$ matrix, silica-doped alumina, spinel, mullite, $\chi$-alumina, $\theta$-alumina, $\kappa$-alumina, boehmite, or a combination of two or more thereof.

The second component includes beta zeolite and a second matrix. The beta zeolite in the second component may have a SAR ranging from about 20 to about 300, about 25 to about 100, about 30 to about 50, or about 30 to about 40.

In certain embodiments, during preparation of the second component, phosphoric acid may be added to form a second component that contains oxidized phosphorus (e.g., $P_2O_5$). The phosphorus may be present in a second component (formed with the addition of phosphoric acid) as $AlPO_4$, on the beta zeolite, and/or as polyphosphates. Second components formed with the addition of phosphoric acid may be referred to herein as "second component with oxidized phosphorus." Reference to the oxidized phosphorus in the second component may also be referred to herein as "$P_2O_5$."

In certain embodiments, during preparation of the second component, silica-alumina binder treated with ammonium phosphate may be added, as described in U.S. Pat. No. 8,940,652 B2, incorporated herein by reference in its entirety) to form a phosphorus treated (PT) second component. Second components formed with silica-alumina binder treated with ammonium phosphate may be referred to herein as "phosphorus treated (PT) second component."

In certain embodiments, during preparation of the second component, silica-alumina binder that was not treated with ammonium phosphate ($SiO_2$) may be added. Second components formed with silica-alumina binder without ammonium phosphate treatment may be referred to herein as "second component with $SiO_2$ binder."

When the second component includes a phosphate based constituent (e.g., oxidized phosphorus or PT), the second component may be substantially free of a transitional alumina (such as gamma-alumina, delta alumina, or a combination thereof) that forms the metal passivating constituent in the first matrix of the first component. It is believed that the combination of a phosphate based constituent (e.g., oxidized phosphorus or PT) with transitional alumina adversely affect the activity of the second component.

The second component may also include $AlPO_4$ generated due to the interaction of boehmite, added during the preparation of the second component, and a phosphate based constituent (such as oxidized phosphorus (e.g., $P_2O_5$)). The amount of boehmite added during the preparation process and correspondingly the $AlPO_4$ content in the second component may contribute to the attrition resistance of the second component.

The beta zeolite structure, activity, and attrition resistance of the second component may be evidenced by one or more of the following properties: zeolite surface area (ZSA), steamed zeolite surface area (ZSA), Brönsted acidity, TC4= (Total butylenes) yield, dose of second component required to achieve an incremental increase of 0.5 wt % (or 1 wt %) of TC4=yield, butylenes to propylene selectivity ratio, coke and bottoms yield and selectivity, and the like. Hence, in various embodiments described herein, the instant disclosure is directed to an FCC catalyst composition that includes a second component having the values described herein for these properties. These values should be viewed as target achievable values and not inherent to the second components described herein.

In certain aspects, the instant disclosure is directed to a method of making an FCC catalyst composition by blending any of the first components described herein with any of the second components described herein. The method may further include adding to the FCC catalyst composition at least one additional component that is compositionally different from the first component and from the second component. For instance, the method may further include adding to the FCC catalyst composition at least one additional component that includes boron oxide, a metal trap or a combination thereof. Additionally, the method may further include adding to the FCC catalyst composition at least one additional component that contains a zeolite, which may be selected from ZSM-5, mordenite, ferrierite, MCM-22, MCM-68, Y zeolite, beta zeolite, or a combination thereof (though other zeolites may also be included in the additional component). The method may further include preparing one or more of: the first component, the second component, and/or the at least one additional component prior to blending the various components together.

In certain aspects, the instant disclosure is directed to a method of cracking a hydrocarbon feed by contacting the feed with any of the FCC catalyst compositions described herein. The method results in a higher total butylenes yield (TC4=yield) while maintaining or reducing the yield and selectivity, e.g., through metal trapping and/or passivation, of less desired products (e.g., coke and hydrogen), as compared to FCC catalyst compositions that do not have either the first component or the second component. The method may also result in a preferential butylenes to propylene selectivity ratio, as compared to FCC catalyst compositions that do not have either the first component or the second component.

Also contemplated herein, in certain embodiments, is an FCC additive composition that includes a second component (including beta zeolite and a second matrix) and a third component including boron oxide. In certain embodiments, the instant disclosure is directed to a method of making the FCC additive composition by blending any of the second components described herein with any of the third components that include boron oxide, as described herein. In certain embodiments, the instant disclosure is directed to a method of cracking a hydrocarbon feed by contacting the feed with any of the FCC additive compositions described herein.

In at least one aspect, an FCC catalyst composition comprises: a first component comprising Y zeolite and a first matrix. In at least one embodiment, the first matrix comprises a metal passivating constituent; and a second component comprising beta zeolite and a second matrix.

In at least one embodiment, the FCC catalyst composition further comprises at least one additional component that is compositionally different from the first component and from the second component. In at least one embodiment, the at least one additional component comprises boron oxide, metal trap, or a combination of two or more thereof.

In at least one embodiment, the at least one additional component comprises boron oxide. In at least one embodiment, the at least one additional component comprises a metal trap. In at least one embodiment, the at least one additional component comprises boron oxide and a metal trap.

In at least one embodiment, the at least one additional component comprises a zeolite selected from ZSM-5, mordenite, ferrierite, MCM-22, MCM-68, Y zeolite, beta zeolite, or a combination thereof. In at least one embodiment, the at least one additional component comprises ZSM-5 zeolite.

In at least one embodiment, the Y zeolite in the first component comprises at least about 15 wt % Y-faujasite crystallized in-situ from a metakaolin-containing calcined microsphere. In at least one embodiment, the first matrix comprises alumina obtained by the calcination of a dispersible boehmite contained in the microsphere.

In at least one embodiment, the first matrix comprises at least about 5 wt %, at least about 10 wt %, or at least about 15 wt % of an alumina in a transitional gamma phase, delta phase, or a combination thereof.

In at least one embodiment, the first matrix further comprises clay, rare-earth doped alumina, silica-alumina, silica-doped alumina, $\chi$-alumina, $\delta$-alumina, $\theta$-alumina, $\kappa$-alumina, boehmite, spinel, mullite, or a combination of any two or more thereof.

In at least one embodiment, the first component is present in the FCC catalyst composition in an amount ranging from about 30 wt % to about 90 wt %, from about 50 wt % to about 85 wt %, or from about 70 wt % to about 80 wt %, based on total weight of the FCC catalyst composition.

In at least one embodiment, the second component comprises $AlPO_4$. In at least one embodiment, the second component comprises $AlPO_4$ at an amount of about 1 wt % to about 25 wt %, about 2 wt % to about 23 wt %, or about 7 wt % to about 20 wt %, based on total weight of the second component.

In at least one embodiment, the second component further comprise one or more of oxidized phosphorous, phosphorous treated component, or a silica-alumina binder.

In at least one embodiment, the second component comprises oxidized phosphorous.

In at least one embodiment, the second component comprises about 1 wt % to about 30 wt %, about 2 wt % to about 25 wt %, or about 5 wt % to about 20 wt % oxidized phosphorous, based on total weight of the second component.

In at least one embodiment, the second component is substantially free of the alumina in the first matrix.

In at least one embodiment, the second matrix further comprises kaolin.

In at least one embodiment, the silica to alumina ratio (SAR) in the beta zeolite ranges from about 20 to about 300, from about 25 to about 100, from about 30 to about 50, or about 30 to about 40.

In at least one embodiment, the zeolite surface area (ZSA) of the second component ranges from about 50 m²/g to about 300 m²/g, from about 75 m²/g to about 200 m²/g, from about 100 m²/g to about 180 m²/g, or from about 120 m²/g to about 170 m²/g, or from about 110 m²/g to about 130 m²/g.

In at least one embodiment, the steamed zeolite surface area (SZSA) of the second component ranges from ranges from about 50 m²/g to about 300 m²/g, from about 75 m²/g to about 140 m²/g, from about 90 m²/g to about 120 m²/g, or from about 100 m²/g to about 110 m²/g, after steaming in 100% steam at 1450° F. for 24 hours.

In at least one embodiment, at least about 65%, at least about 70%, or at least about 75%, at least about 80%, at least about 90%, or about 80% to about 90% of the ZSA of the second component is maintained after steaming in 100% steam at 1450° F. for 24 hours.

In at least one embodiment, the Brönsted acidity of the second component ranges from about 10 µmol/g to about 65 µmol/g, from about 25 µmol/g to about 60 µmol/g, or about 35 µmol/g to about 55 µmol/g.

In at least one embodiment, the air jet attrition rate (AJAR) of the second component is less than about 5 wt %/hr, less than about 4.5 wt %/hr, or less than about 4 wt %/hr.

In at least one embodiment, the second component is present in the FCC catalyst composition in an amount ranging from about 0.1 wt % to about 20 wt %, from about 1 wt % to about 15 wt %, or from about 2 wt % to about 10 wt %, based on total weight of the FCC catalyst composition.

In at least one embodiment, the boron oxide component comprises a third matrix and boron oxide. In at least one embodiment, the boron oxide component is suitable for passivating and/or trapping at least one metal selected from nickel, vanadium, or mixtures thereof. In at least one embodiment, the third matrix is selected from kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia, sepiolite, and a combination thereof.

In at least one embodiment, the boron oxide is present in the FCC catalyst composition in an amount ranging from about 0.1 wt % to about 20 wt %, from about 2 wt % to about 18 wt %, or from about 5 wt % to about 15 wt %, based on total weight of the FCC catalyst composition.

In at least one embodiment, the metal trap comprises catalytically inactive materials comprising: a fourth matrix; and a rare earth oxide dispersed within the fourth matrix, the rare earth oxide comprising a mixture of oxide and rare earth aluminate salts. In at least one embodiment, the rare earth oxide comprises lanthanum oxide in an amount of at least about 5 wt %, at least about 10 wt %, or at least about 15 wt %, based on total weight of the metal trap.

In at least one embodiment, the fourth matrix has a mullite content of at least about 15 wt %, at least about 25 wt %, or at least about 35 wt %.

In at least one embodiment, the metal trap is suitable for passivating and/or trapping at least one metal selected from nickel, vanadium, or mixtures thereof.

In at least one embodiment, the metal trap is present in the FCC catalyst composition in an amount ranging from about 0.1 wt % to about 20 wt %, from about 2 wt % to about 18 wt %, or from about 5 wt % to about 15 wt %, based on total weight of the FCC catalyst composition.

In at least one embodiment, the at least one additional zeolite component is present in the FCC catalyst composition in an amount ranging from about 0.1 wt % to about 10 wt %, from about 0.5 wt % to about 7 wt %, or from about 1 wt % to about 4 wt %.

In at least another aspect, a method of making an FCC catalyst composition comprises blending a first component and a second component. In at least one embodiment, the first component comprises Y zeolite and a first matrix, the first matrix comprises a metal passivating constituent, and the second component comprises beta zeolite and a second matrix.

In at least one embodiment, the method further comprises forming in-situ the first component from: a metakaolin-containing microsphere; and an alumina-containing matrix contained in the metakaolin containing calcined microsphere, the alumina-containing matrix obtained by calcination of a dispersible crystalline boehmite and a hydrous kaolin at a temperature of about 1350° F. to about 1500° F.

In at least one embodiment, the method further comprises forming the second component by: slurry blending beta zeolite with a second non-zeolitic material comprising boehmite alumina and kaolin to form a slurry; and spray drying the slurry to form a second microspheroidal FCC catalyst material.

In at least one embodiment, the method further comprises adding phosphoric acid during the spray drying.

In at least one embodiment, the method further comprises calcining the spray dried, and optionally $P_2O_5$ containing, second microspheroidal FCC catalyst material, to form the second component.

In at least one embodiment, the method further comprises blending at least one additional component comprising boron oxide, a metal trap, or a combination thereof.

In at least one embodiment, the method further comprises forming a boron oxide component by: impregnating or loading boron oxide onto particles comprising a third matrix; or mixing boron oxide with a third matrix comprising a non-zeolitic component followed by spray drying the mixture of boron oxide and third matrix to form boron oxide particles. In at least one embodiment, the third matrix comprises a non-zeolitic component.

In at least one embodiment, the method further comprises forming the metal trap by: calcining hydrous kaolin at a temperature of at least about 1050° C. to form a fourth matrix; and dispersing a rare earth oxide in the fourth matrix.

In at least one embodiment, the method further comprises blending at least one additional zeolite component that is compositionally different from the first component and from the second component.

In at least one embodiment, the at least one additional zeolite component comprises a zeolite selected from ZSM-5, mordenite, ferrierite, MCM-22, MCM-68, Y zeolite, beta zeolite, or a combination thereof.

In at least another aspect, a method of cracking a hydrocarbon feed comprises contacting the feed with a FCC catalyst composition comprising a first component and a second component. In at least one embodiment, the first component comprises Y zeolite and a first matrix, the first matrix comprises a metal passivating constituent, and the second component comprises beta zeolite and a second matrix.

In at least one embodiment, the method results in an average butylenes to propylene selectivity ratio of greater than about 0.7, greater than about 0.8, greater than about 0.85, greater than about 0.9, or greater than about 0.95.

In at least one embodiment, the method maintains an average butylenes to propylene selectivity ratio that is within about 5%, within about 10%, or within about 15% of the average butylenes to propylene selectivity ratio obtained when contacting the feed with a FCC catalyst composition that comprises the first component without the second component or the second component without the first component.

In at least one embodiment, the method results in increase of the total butylenes yield (TC4=) of greater than about 0.2 wt %, greater than about 0.3 wt %, greater than about 0.4 wt %, or greater than about 0.5 wt %, when compared to contacting the feed with a FCC catalyst composition that comprises the first component without the second component.

In at least one embodiment, the method results, through metal passivation, in decrease of the total coke and/or hydrogen of at least about 5 wt %, at least about 10 wt %, at least about 15 wt %, or at least about 20 wt %, when compared to contacting the feed with a FCC catalyst composition that comprises the second component without the first component.

In at least one embodiment, the method results in increase of the total C5=olefins yield (TC5=) when compared to contacting the feed with an FCC catalyst composition that comprises the first component without the second component.

In at least one embodiment, the method results in increase of the total C5=olefins yield (TC5=) of greater than about 0.2 wt %, or greater than about 0.3 wt %, when compared to contacting the feed with an FCC catalyst composition that comprises the first component without the second component.

In at least one embodiment, the method results in increase of the total C5=olefins yield (TC5=) of greater than about 0.2 wt %, or greater than about 0.3 wt %, when compared to contacting the feed with an FCC catalyst composition for which the second component is replaced with ZSM-5.

In at least one embodiment, the FCC catalyst component further comprises at least one additional component that is compositionally different from the first component and from the second component.

In at least one embodiment, the at least one additional component comprises boron oxide, metal trap, or a combination of two or more thereof.

In at least one embodiment, the at least one additional component comprises a zeolite selected from ZSM-5, mordenite, ferrierite, MCM-22, MCM-68, Y zeolite, beta zeolite, or a combination thereof.

In at least another aspect, an FCC additive composition comprises: a second component comprising beta zeolite and a second matrix; and a third component comprising boron oxide and a third matrix.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DEFINITIONS

Figure 1:
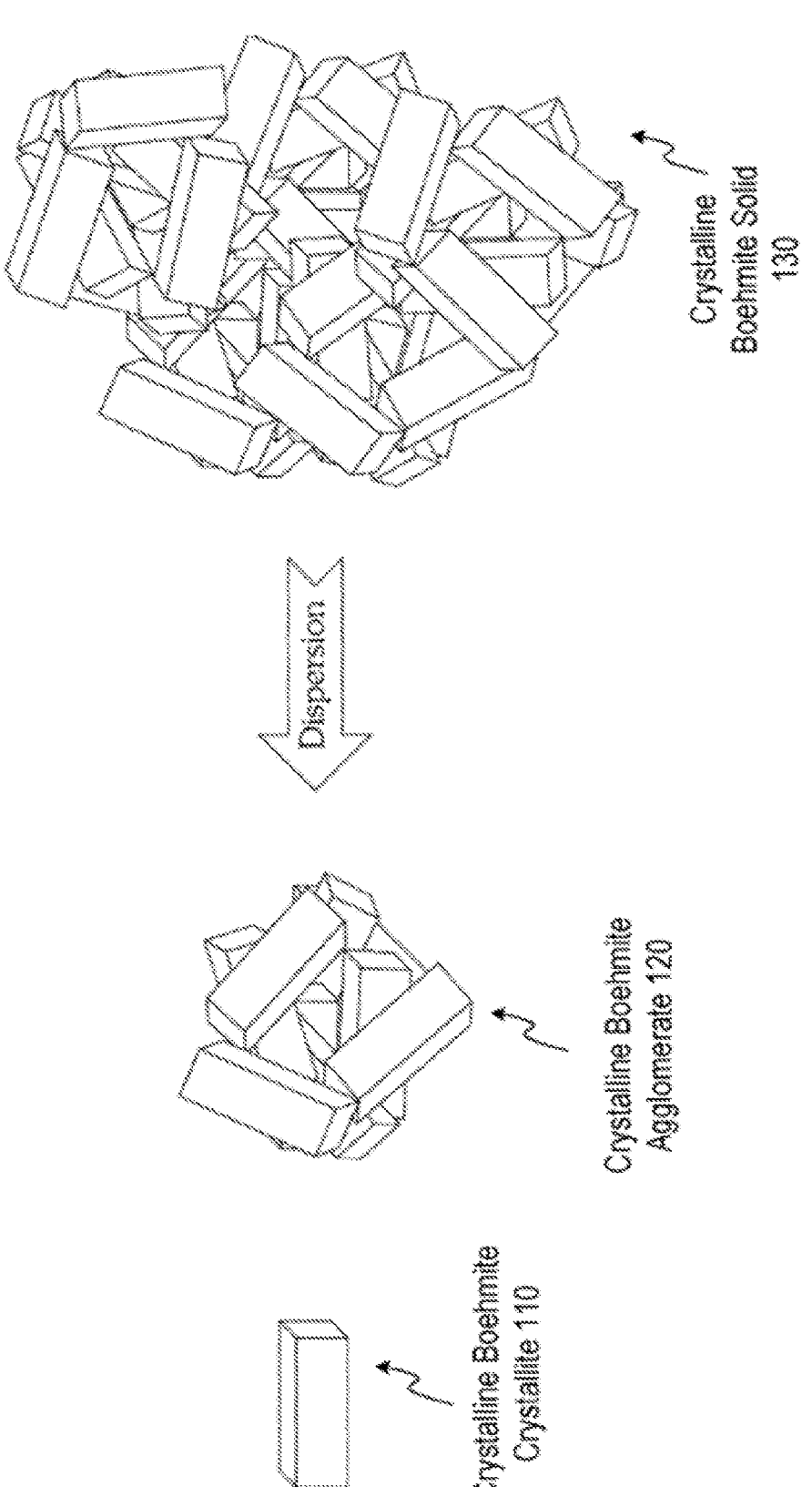
FIG. 1 illustrates different types of crystalline boehmite, according to one embodiment.

As used herein, the singular forms "a," "an," and "the" include plural references unless the context clearly indicates otherwise. Thus, for example, reference to "a component" includes a single component as well as a mixture of two or more similar or different components, and the like.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

As used herein, the term "catalyst" or "catalyst composition" or "catalyst material" refers to a material that promotes a reaction. As used herein, the term "composition," when referring to an FCC catalyst composition or an FCC additive composition, refers to a blend or a mixture of two or more separate and distinct components, such as a first component mixed or blended with a second component. In certain embodiments, the components in the composition are chemically combined and cannot be separated through physical means (e.g., filtration). In other embodiments, the components in the composition are not chemically combined and may be separated through physical means (e.g., filtration).

As used herein, the term "fluid catalytic cracking" or "FCC" refers to a conversion process in petroleum refineries where high-boiling, high-molecular weight hydrocarbon fractions of petroleum crude oils are converted to more valuable gasoline, olefinic gases, and other products.

"Cracking conditions" or "FCC conditions" refers to typical FCC process conditions. Typical FCC processes are conducted at reaction temperatures of 450° to 650° C. with catalyst regeneration temperatures of 600° to 850° C. Hot regenerated catalyst is added to a hydrocarbon feed at the base of a rise reactor. The fluidization of the solid catalyst particles may be promoted with a lift gas. The catalyst vaporizes and superheats the feed to the desired cracking temperature. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products are fractionated into a series of products, including gas, gasoline, light gas oil, and heavy cycle gas oil. Some heavier hydrocarbons may be recycled to the reactor.

As used herein, the term "feed" or "feedstock" refers to that portion of crude oil that has a high boiling point and a high molecular weight. In FCC processes, a hydrocarbon feedstock is injected into the riser section of an FCC unit, where the feedstock is cracked into lighter, more valuable products upon contacting hot catalyst circulated to the riser-reactor from a catalyst regenerator.

As used herein, the term "resid" refers to that portion of crude oil that has a high boiling point and a high molecular weight and typically contains contaminant metals including Ni, V, Fe, Na, Ca, and others. The contaminant metals, particularly Ni and V, have detrimental effects on catalyst activity and performance. In some embodiments, in a resid feed operation, one of Ni and V metals accumulate on the catalyst, and the FCC catalyst composition is effective to reduce the detrimental effects of nickel and vanadium during cracking.

As used herein, the term "one or more boron oxide components" refers to the presence of multiple species of boron oxide. For example, in one or more embodiments, boron oxide components can include a boron oxide in a trigonal environment (e.g. $BO_3$) and in a tetrahedral oxygen environment (e.g. $BO_4$—). Differences in the chemical composition of the boron oxide species after reaction with FCC catalysts containing Ni and other metals can be observed by peak changes in boron nuclear magnetic resonance ($^{11}B$ NMR) analyses. It is believed that boron oxide can interact with transition metals, such as Ni and V, and inhibit the dehydrogenation activity of the transition metal by forming a metal-borate (e.g. Ni-borate) complex, which results in a reduction in coke and hydrogen yields during cracking of hydrocarbons. However, because boron oxide is mobile, the trapping mechanism is different than that of a transition alumina.

As used herein, "particles" can be in the form of microspheres which can be obtained by spray drying. As is understood by skilled artisans, microspheres are not necessarily perfectly spherical in shape.

As used herein, the terms "non-zeolitic component" or "matrix" refer to the components of an FCC catalyst that are not zeolites or molecular sieves. As used herein, the non-zeolitic component can comprise binder and filler.

As used herein, the term "zeolite" refers to is a crystalline aluminosilicate with a framework based on an extensive three-dimensional network of silicon, aluminum and oxygen ions and have a substantially uniform pore distribution.

As used herein, the term "intergrown zeolite" refers to a zeolite that is formed by an in-situ crystallization process.

As used herein, the term "in-situ crystallized" refers to the process in which a zeolite is grown or intergrown directly on/in a microsphere and is intimately associated with the matrix or non-zeolitic material, for example, as described in U.S. Pat. Nos. 4,493,902 and 6,656,347. The zeolite is intergrown directly on/in the macropores of the precursor microsphere such that the zeolite is intimately associated is uniformly dispersed on the matrix or non-zeolitic material.

As used herein, the term "incorporated catalyst" refers to a process in which the zeolitic component is crystallized and then incorporated into microspheres in a separate step.

As used herein, the terms "preformed microspheres" or "precursor microspheres" refer to microspheres obtained by spray drying and calcining a non-zeolitic component.

As used herein, the term "zeolite-containing microsphere" refers to a microsphere obtained either by in-situ crystallizing a zeolite material on pre-formed precursor microspheres or by microspheres in which the zeolitic component is crystallized separately and then mixed with the precursor microspheres.

The terms "passivator" and "trap" are used herein interchangeably, and the composition of the present invention contains components that may passivate and/or trap the metal contaminants. "Passivator" is defined as a composition that reduces the activity of unwanted metals, i.e. nickel and vanadium to produce contaminant $H_2$ and coke during the FCC process. While a "trap" is a composition that immobilizes contaminant metals that are otherwise free to migrate within or between microspheres in the FCC catalyst composition, i.e. V and Na.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate certain materials and methods and does not pose a limitation on scope. No language in the specification should be construed as indicating any non-claimed element as essential to the practice of the disclosed materials and methods.

DETAILED DESCRIPTION

This disclosure is directed in certain embodiments to a fluid catalytic cracking (FCC) catalyst composition that includes a first component and a second component. The first component includes Y zeolite and a first matrix, where the first matrix includes a metal passivating constituent. The second component includes beta zeolite and a second matrix. In certain embodiments, the first component and the second component may be separate microspheroidal FCC catalysts, though other suitable shapes may also be utilized for these components.

The FCC catalyst composition may further include at least one additional component that is compositionally different from the first component and from the second component. The at least one additional component may be a component that includes boron oxide, a metal trap and/or passivation component, or a combination thereof. The at least one additional component could also be a zeolite containing component.

This disclosure is also directed in certain embodiments to a method of preparing the FCC catalyst composition, including, in certain embodiments, to methods of preparing each of the first component, the second component, and certain additional components that may be included in the FCC catalyst compositions described herein.

This disclosure is also directed in certain embodiments to a method of using the FCC catalyst composition when cracking a hydrocarbon feed to increase the total butylenes yield while maintaining a favorable butylenes to propylene selectivity ratio, all while passivating and/or trapping metal contaminants (such as Ni and/or V) and without compromising the yield and selectivity of less desirable products, such as hydrogen and coke.

Each of the first and second components and additional components that may be included in the catalyst composition, along with methods of their preparation, will be described below separately, followed by a description of the FCC catalyst compositions along with a method of their preparation and use.

First Component

In one embodiment, the first component includes a Y-faujasite crystallized in-situ from a metakaolin-containing calcined microsphere. The first component further includes a first matrix that includes a metal passivating constituent (e.g., nickel and/or vanadium passivating constituent). The metal passivating constituent may be an alumina-containing matrix obtained by calcination of a dispersible crystalline boehmite and a kaolin contained in the metakaolin-containing calcined microsphere.

Preparation of the first component, in accordance with one embodiment of this disclosure, involves an initial step of preparing microspheres comprising hydrous kaolin clay and/or metakaolin, a dispersible crystalline boehmite ($Al_2O_3$, $H_2O$), optionally spinel and/or mullite, and a sodium silicate or silica sol binder. The microspheres are calcined to convert any hydrous kaolin component to metakaolin. The calcination process transforms the dispersible boehmite into a transitional alumina phase (e.g., gamma alumina). The calcined microspheres are reacted with an alkaline sodium silicate solution to crystallize in-situ zeolite Y to make Y-faujasite that are subsequently ion-exchanged. The transitional alumina phase (that results from the dispersible crystalline boehmite during the preparative procedure) forms the first matrix of the first component and passivates the Ni and V that are deposited on to the first component during the cracking process, especially during cracking of heavy residuum feeds. The first component further has an unexpected reduction in contaminant coke and hydrogen yields. Contaminant coke and hydrogen arise due to the presence of Ni and V and reduction of these byproducts significantly improves FCC operation. The various constituents of the first component and the process of preparing the first component is described in further detail below.

The first component may be made by spray drying a feed mixture of hydrated kaolin, metakaolin, and a binder such as silica sol or sodium silicate. In one embodiment, the spray-dried microspheres are acid-neutralized and washed to reduce sodium content. The spray-dried microspheres may be subsequently calcined to form precursor porous microspheres. In one embodiment, the hydrous kaolin is maintained as an inert component by calcining at lower temperatures so as to avoid the endothermic transformation of the hydrous kaolin component to metakaolin. Calcination temperatures of less than 1000° F., preferably less than 800° F., can be used to calcine the spray dried microspheres.

The amount of metakaolin in the spray dried and optionally calcined microspheres provides the soluble alumina available to grow zeolite. The amount of metakaolin present in the spray-dried microspheres is limited with respect to the inerts such as hydrous kaolin so that the yield of zeolite is limited during crystallization. An excessive level of metakaolin in the reactive microsphere would yield a high level of zeolite that would reduce the porosity of the microsphere to an undesired low level. Accordingly, in one embodiment, the spray dried microspheres, after optional calcination, contain a metakaolin content of up to 50 wt. %. In another embodiment, the spray dried microspheres, after optional calcination, contain a metakaolin content of up to 45 wt %. In another embodiment, the spray dried microspheres, after optional calcination, contain a metakaolin content of 30-40 wt. %.

In one embodiment, any binder used contains only sodium, expressed as $Na_2O$, which is easily removed. Although the silica or silicate binders traditionally used do bring these nutrients into the zeolite crystallization process, the binders are to provide mechanical strength to the green microspheres sufficient to withstand processing up until crystallization. Therefore, a binder capable of fulfilling this role while not interfering with the other constraints described herein may be used. Aluminum chlorohydrol for example may be used as the binder.

The precursor microspheres are reacted with zeolite seeds and an alkaline sodium silicate solution, substantially as described in U.S. Pat. No. 5,395,809, the teachings of which are incorporated herein by cross-reference. The microspheres are crystallized to a desired zeolite content (typically about 40-75%), filtered, washed, ammonium exchanged, exchanged with rare-earth cations if required, calcined, exchanged a second time with ammonium ions, and calcined a second time if required.

Table 1, below, shows compositions of the solids in the slurries that are spray dried to form porous microspheres, and later optionally calcined at low temperature to prepare precursor reactive microspheres. Table 1 displays the ingredients of the compositions as the weight percent of metakaolin and inerts on a binder-free basis. The inerts may include calcined boehmite for metal passivation and one or more of hydrated kaolin or kaolin calcined through the exotherm (spinel or mullite). Table 1 displays the weight % $SiO_2$ binder based on the grams of $SiO_2$ in the binder per gram of total weight of moisture-free spray dried microspheres and provided by sodium silicate. In one embodiment, the spray dried microspheres will have a size of from about 20 to 150 microns. In another embodiment, the size of the spray dried microspheres will range from about 50 to 100 microns. In another embodiment, the size of the spray dried microspheres will range from about 65-90 microns.

TABLE 1

| Weight percent of the constituents (kaolin and inerts) of the first component on a binder-free basis | | | |
|---|---|---|---|
| Constituent | First Embodiment (wt %) | Second Embodiment (wt %) | Third Embodiment (wt %) |
| Hydrous Kaolin | 5-80 | 10-75 | 15-70 |
| Metakaolin | 20-50 | 25-45 | 30-45 |
| Boehmite Alumina (calcined) | Greater than 0-30 | 10-25 | 15-25 |
| Kaolin calcined through exotherm (e.g., mullite and/or spinel) | 0-40 | 5-30 | 10-30 |
| Binder | 2-35 | 4-25 | 5-15 |

Hydrous kaolin is used as an inert in the slurry and acts as an alumina-containing matrix precursor of the catalyst (also referred to as the first matrix of the first component). Thus, once crystallized, the zeolite catalyst may contain a silica-alumina matrix derived from the hydrous kaolin. The hydrous kaolin used as the alumina-containing matrix precursor of the catalytic microspheres is not singularly critical and can be obtained from a wide variety of commercial sources (e.g., derived from coarse white kaolin crudes, finer particle size hydrous kaolins derived from gray clay deposits, or hydrous kaolin source that is in the form of an ultrafine powder pulverized and calcined through its characteristic exotherm with or without formation of mullite (e.g., about 5-40 wt % mullite)). The particle size of the hydrous kaolin is generally known to have an impact on microsphere porosity, so the resultant crystallized catalyst macroporosity can be manipulated in part by manipulation of the hydrous kaolin particle size.

Calcination of these hydrous kaolins at temperatures of 1200° F. results in endothermic dehydroxylation of the hydrous kaolin to metakaolin which can be used as the metakaolin component of the feed slurry.

The first matrix can be derived at least in part from alumina-containing materials more generally characterized by the porosity thereof (as assessed by their incipient slurry point (ISP) measured as described in U.S. Pat. No. 10,633, 596, the teachings of which are incorporated herein in its entirety) provided during the packing of the calcined material. The first matrix may also be derived in part from delaminated kaolin, platelet alumina, and precipitated alumina. Methods of delaminating booklets or stacks of kaolin may include using a particulate grinding medium (e.g., sand, glass microballoons). Subsequent to delamination, the platelets are pulverized to derive the random packing or "house of cards" morphology. An advantage of the matrix precursors meeting the ISP test specification, as described in U.S. Pat. No. 10,633,596, is that they bring higher pore volume per unit matrix surface area. This maximizes the effectiveness of the catalyst by minimizing both catalytic coke (pore volume) and contaminant coke (matrix surface area).

In one embodiment, silicate for the binder is provided by sodium silicates with $SiO_2$ to $Na_2O$ ratios of from 1.5 to 3.5. In another embodiment, silicate for the binder is provided by sodium silicates with $SiO_2$ to $Na_2O$ ratios of from 2.00 to 3.22.

It is also within the scope of this disclosure to derive the matrix in part from chemically synthesized spinel and/or mullite. Thus, Okata, et al., "Characterization of Spinel Phase from $SiO_2$—$Al_2O_3$ Xerogels and the Formation Process of Mullite," Journal of the American Ceramic Society, 69 [9] 652-656 (1986), the entire contents of which are incorporated herein by reference disclose that two kinds of xerogels can be prepared by slow and rapid hydrolysis of tetraethyoxy silane and aluminum nitrate nonahydrdate dissolved in ethanol. The slow hydrolysis method involves gelling the above mixture in an oven at 60° C. for one to two weeks whereas the rapid hydrolysis method involves adding ammonium hydroxide solution to the mixture and drying in air. Xerogels prepared by the slow hydrolysis method crystallizes mullite directly from the amorphous state on firing whereas the xerogels formed by rapid hydrolysis crystallizes a spinel phase before mullite formation. As long as such calcined synthetic materials have a water pore volume within the scope of this disclosure, such materials can be used to derive, at least in part, the high-alumina matrix of the catalyst of this disclosure.

In order to passivate contaminant metals, such as nickel and vanadium, the first matrix may further includes a metal passivating constituent. In certain embodiments, the metal passivating constituent is an alumina source, such as primary crystalline boehmite agglomerates derived from highly dispersible crystalline boehmite solids. In one embodiment, the crystalline boehmite solids are synthetic boehmite aluminas of high purity, with equal or less than 20 ppm of $Na_2O$, equal or less than 100 ppm of $Fe_2O_3$, and equal or less than 120 ppm of $SiO_2$.

Without being construed as limiting, it is believed that there may be a relationship between the dimensions of the crystalline boehmite (e.g., crystallites, agglomerates, and/or solids) and the metal passivation performance of the first component. FIG. 1 illustrates a crystalline boehmite crystallite 110, a crystalline boehmite agglomerate 120, and a crystalline boehmite solid 130. A crystalline boehmite crystallite 110 may have a plurality of sides that have a one or more corresponding lengths. The greatest of the one or more corresponding lengths may be the crystallite size. Two or more crystalline boehmite crystallites 110 may form a crystalline boehmite agglomerate 120 (e.g., crystalline boehmite agglomerate 120). A crystalline boehmite solid 130 may include more crystalline boehmite crystallites 110 than the crystalline boehmite agglomerate 120. The crystalline boehmite solid 130 may be highly dispersible. As illustrated by FIG. 1, crystalline boehmite solids 130 are the ready-made, large blocks composed of packed crystalline boehmite crystals. Such solids, when applied to be incorporated into the first component, are dispersed in either surfactants or acid solutions to be reduced in size to primary crystalline boehmite agglomerate particles, which cannot be broken down further, without exerting more energy than is require to produce the first component. The crystallite size mentioned here is that of the size of the crystalline boehmite crystallite 110.

In one embodiment, the crystalline boehmite crystallite 110 has a crystallite size of larger than 50 Å, larger than 100 Å, or larger than 150 Å. In another embodiment, the crystalline boehmite crystallite 110 has a crystallite size of less than 300 Å, less than 400 Å, or less than 500 Å.

It has been found that the first component, being both macroporous and with the macropore walls lined with zeolite and with the mesoporous (e.g., containing pores with diameters between 2 and 50 nm) or microporous matrix (e.g., containing pores with diameters less than 2 nm) produced in part from crystalline boehmite of crystallite size of greater than 50 Å and less than 500 Å, are reasons that the first component excels at gasoline, hydrogen and coke selectivity.

Crystalline boehmite solids 130 are dispersed by dispersants to form primary crystallite boehmite agglomerate 120, that when converted to gamma alumina (or delta alumina or a combination of gamma alumina and delta alumina), enable an unexpected increase in gasoline yield and an unexpected reduction in hydrogen and coke yield for the first component and correspondingly for the FCC catalyst composition that includes the first component. For making the FCC catalyst, in one embodiment, upon calcination at least 80%, at least 97%, or at least 98% of the primary crystalline agglomerates 120 are converted to transitional alumina, or gamma alumina (or delta alumina or a combination of gamma alumina and delta alumina). The primary crystalline boehmite agglomerate particles having the mentioned crystallite size range increases the percentage of the reactive phase of the first component, enabling an unexpected reduction of hydrogen and coke yields, and an increase in gasoline yield.

Other aluminas such as pseudo-boehmite with low dispersibility, and gibbsite are not as effective and the first component preferably contains no pseudo-boehmite as the starting crystalline boehmite solids. Dispersibility of the hydrated alumina is the property of the alumina to disperse effectively in an acidic media such as formic acid of pH less than about 3.5. Such acid treatment is known as peptizing the alumina or the crystalline boehmite solids, into primary crystalline boehmite agglomerates. Monoprotic acids, preferably formic, can be used to peptize the crystalline boehmite. Other acids that can be employed to peptize the alumina are nitric and acetic. High dispersion is when 90% or more of the alumina disperses into particles less than about 1 micron. Alternatively, crystalline boehmite may also be dispersed by polymeric dispersants. Useful polymeric dispersants are of polymers such as anionic, cationic and non-ionic polyacrylamides; anionic, cationic and non-ionic polyacrylates; anionic, cationic and non-ionic copolymers of acrylamides and acrylates; anionic, cationic and non-ionic acrylic acid/sulfonic acid copolymers; anionic, cationic and non-ionic maleic acid homopolymers; and anionic, cationic and non-ionic maleic acid/acrylic acid copolymers.

The surface area (average Brunauer-Emmett-Teller (BET), nitrogen) of the crystalline boehmite, as well as the gamma-delta alumina conversion product, upon calcination, in one embodiment is below about 250 m²/g. In another embodiment, the surface area (average BET) is below 125 m²/g. In another embodiment, the surface area (average BET) is below 100 m²/g. In another embodiment, the surface area (average BET) is from 30 to 80 m²/g.

Table 2, below, shows typical properties of fully peptizable and dispersible crystalline boehmite agglomerates 120, which can be used in practice of the disclosure.

TABLE 2

| Typical Properties of Fully Peptizable and Dispersible Crystalline Boehmite Agglomerate 120 | |
| --- | --- |
| $Al_2O_3$ wt % | 99.0 min (ignited) |
| Carbon wt % | 0.5 max |
| $SiO_2$ wt % | 0.015 max |
| $Fe_2O_3$ wt % | 0.015 max |
| $Na_2O$ wt % | 0.005 max |
| Surface Area (m²/g) | (before calcination) 50-400 |
| Pore Volume (cc/g) | 70% in pores having radii from 5 to 1,000 Å units |
| Total Volatiles | ~20 wt. % max |

During production, the primary crystalline boehmite agglomerates 120 are calcined prior to incorporation into the microsphere. As a result of calcination, the crystalline boehmite is converted to a porous gamma phase and to a lesser extent a delta alumina. The BET surface area of this material increases marginally, e.g., increases from 80 m²/g to 100 m²/g. The calcined boehmite converted to the gamma phase is added to the slurry of hydrous kaolin, metakaolin, and other alumina matrix components and spray dried into the microspheres. Upon zeolite crystallization, the gamma alumina will not be leached from the microspheres by the alkaline silicate solution. When the dispersed alumina solution is calcined and spray dried with the kaolin and binder, the resulting microsphere contains uniformly distributed gamma alumina throughout the microsphere.

In some embodiments, the first component includes from any of about 1 wt %, about 3 wt %, about 5 wt %, about 8 wt %, about 10 wt %, about 15 wt %, about 20 wt %, or about 25 wt % to any of about 30 wt %, about 35 wt %, about 40 wt %, about 45 wt %, about 50 wt %, about 60 wt %, about 70 wt %, or about 80 wt %, transitional alumina (e.g., gamma-alumina, delta alumina, or a combination thereof), based on total weight of the first component. In certain embodiments, the first component includes about 1 wt % to about 80 wt %, about 5 wt % to about 60 wt %, about 10 wt % to about 70 wt %, about 10 wt % to about 40 wt %, transitional alumina (e.g., gamma-alumina, delta alumina, or a combination thereof), or any sub-range or single value therein, based on total weight of the first component. In some embodiments, the first component includes about 1 wt % to about 60 wt % of the transitional alumina (e.g., gamma-alumina, delta alumina, or a combination thereof). In some embodiments, the first component includes about 10 wt % to about 40 wt % of the transitional alumina (e.g., gamma-alumina, delta alumina, or a combination thereof). In particular embodiments, the first component includes about 30 wt % the transitional alumina (e.g., gamma-alumina, delta alumina, or a combination thereof).

In some embodiment described herein, the first component or the first matrix may include clay, rare earth-doped alumina (e.g., selected from one or more of ytterbium-doped alumina, gadolinium-doped alumina, cerium-doped alumina, or lanthanum-doped alumina), $SiO_2$-$Al_2O_3$ matrix, silica-doped alumina, gamma-alumina, χ-alumina, δ-alumina, θ-alumina, κ-alumina, boehmite, mullite, spinel, or mixtures of two or more thereof. In particular embodiments, the first component or the first matrix may include a mixture of gamma-alumina and one or more of clay, rare earth-doped alumina (e.g., selected from one or more of ytterbium-doped alumina, gadolinium-doped alumina, cerium-doped alumina, or lanthanum-doped alumina), $SiO_2$—$Al_2O_3$ matrix, silica-doped alumina, χ-alumina, δ-alumina, θ-alumina, κ-alumina, boehmite, mullite, and spinel. In some embodiments, the first component or first matrix may include a mixture of gamma-alumina, delta-alumina, and one or more of clay, rare earth-doped alumina (e.g., selected from one or more of ytterbium-doped alumina, gadolinium-doped alumina, cerium-doped alumina, or lanthanum-doped alumina), $SiO_2$—$Al_2O_3$ matrix, silica-doped alumina, θ-alumina, κ-alumina, boehmite, mullite, and spinel.

In one aspect, the metal passivating constituent (e.g., transitional alumina such as gamma alumina, delta alumina, or a combination thereof) may further include a rare earth element, an alkaline earth element, or a mixture of any two or more such elements. For example, the metal passivating constituent may include a rare earth element. In particular embodiments, the rare earth element may be ytterbium, gadolinium, cerium, lanthanum, or a mixture of any two or more thereof. In some embodiments, the metal passivating constituent includes alkaline earth metals. In further embodiments, the alkaline earth metal is at least one of barium, calcium, or magnesium, or a mixture of any two or more thereof. In certain embodiments, the rare earth or alkaline earth elements are present in an amount of about 0.1 wt % to about 12 wt %, about 1 wt % to about 10 wt %, about 1 wt % to about 5 wt %, or about 1 wt % to about 3 wt % based on total weight of the metal passivating constituent.

In one embodiment, the pore volume of the crystallized zeolite microsphere, which is formed using hydrous kaolin to form the catalyst matrix, is greater than 0.15 cc/gm, or greater than 0.25 cc/gm. In one embodiment, the first component has a BET surface area less than 500 m²/g, less than 475 m²/g, or within a range of about 300-450 m²/g. The moderate surface area of the first component in combination with the macroporosity achieves the desired activity and selectivities to gasoline while reducing gas and coke yields.

The steam-aged surface area and activity may be balanced against the available pore volume. The surface areas for finished product (fresh) catalyst are chosen such that the surface area after a 1500° F., four hour steaming at 1 atm steam pressure are generally below 300 m²/g.

Y-faujasite is allowed to crystallize by mixing the kaolin microspheres with the appropriate amounts of other constituents (including at least sodium silicate and water), as discussed in detail below, and then heating the resulting slurry to a temperature and for a time (e.g., to 200°–215° F. for 10-24 hours) sufficient to crystallize Y-faujasite in the microspheres. The prescriptions of U.S. Pat. No. 4,493,902 may be followed as written.

After the crystallization process is terminated, the microspheres containing Y-faujasite are separated from at least a substantial portion of their mother liquor (e.g., by filtration). It may be desirable to wash to microspheres by contacting them with water either during or after the filtration step. The purpose of the washing step is to remove mother liquor that would otherwise be left entrained within the microspheres.

In order to obtain a product having acceptable catalytic properties, sodium cations in the microspheres are replaced with more desirable cations. This may be accomplished by contacting the microspheres with solutions containing ammonium or rare earth cations or both. The ion exchange step or steps are preferably carried out so that the resulting catalyst contains less than about 0.7%, less than about 0.5%, less than about 0.4%, or less than about 0.3%, by weight $Na_2O$. After ion exchange, the microspheres are dried to obtain the microspheres of the present disclosure. In order to make 0 (zero) wt. % rare earth (REO) catalysts, the Na⁺ cations are exchanged by using only an ammonium salt such as $NH_4NO_3$ and without using any rare earth salt during exchange. Such 0 (zero) wt. REO catalysts are especially beneficial as FCC catalysts that give higher octane gasoline and more olefinic product. Rare earth levels in the range of 0.1% to 12% usually between 0.5% and 7% (weight basis) are contemplated. In some embodiments, the rare earth element may be lanthanum, cerium, praseodymium, neodymium, yttrium, or a mixture of any two or more.

Following ammonium and rare earth exchange, the catalyst is calcined at 1100°–1200° F. for 1-2 hours and unit cell size of the Y zeolite is reduced. Preferably, this calcination is done in a covered tray with 25% free moisture present.

In one embodiment, the first component includes microspheres containing at least about 10 wt %, at least about 15 wt %, at least about 20 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, or at least about 80 wt %, and preferably from 40 to 65% by weight Y-faujasite, expressed on the basis of the as-crystallized sodium faujasite form zeolite. The term Y-faujasite shall encompass the zeolite in its sodium form as well as in the known modified forms, including, e.g., rare earth and ammonium exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique.

In one embodiment, the Y-faujasite component of the microspheres, in their sodium form, has a crystalline unit cell size of less than about 24.75 Å, less than about 24.73 Å, less than about 24.69 Å, less than about 24.65 Å, less than about 24.60 Å, less than about 24.55 Å, or about 24.25 Å to about 24.70 Å.

The first component may be present in the FCC catalyst composition in an amount ranging from any of about 10 wt %, about 15 wt %, about 20 wt %, about 25 wt %, about 30 wt %, about 35 wt %, about 40 wt %, about 45 wt %, or about 50 wt % to any of about 55 wt %, about 60 wt %, about 65 wt %, about 70 wt %, about 75 wt %, about 80 wt %, about 85 wt %, or about 90 wt %, based on total weight of the FCC catalyst composition. In certain embodiments, the first component is present in the catalyst composition in an amount ranging from about 10 wt % to about 90 wt %, from about 30 wt % to about 80 wt %, from about 50 wt % to about 70 wt %, or from about 70 wt % to about 80 wt %, or any sub-range or single value therein, based on total weight of the FCC catalyst composition.

Second Component

In one embodiment, the second component includes a beta zeolite and a second matrix. The second component may be a second microspheroidal FCC catalyst in certain embodiments though other catalyst shapes may also be suitably used. The second component is an incorporated catalyst.

The second component may be present in the FCC catalyst composition in an amount ranging from any of about 0.1 wt %, about 0.3 wt %, about 0.5 wt %, about 0.8 wt %, about 1 wt %, about 2 wt %, about 3 wt %, about 4 wt %, or about 5 wt % to any of about 6 wt %, about 7 wt %, about 8 wt %, about 9 wt %, about 10 wt %, about 12 wt %, about 15 wt %, or about 20 wt %, based on total weight of the FCC catalyst composition. In certain embodiments, the second component is present in the catalyst composition in an amount ranging from about 0.1 wt % to about 20 wt %, from about 1 wt % to about 15 wt %, from about 2 wt % to about 10 wt %, or any sub-range or single value therein, based on total weight of the FCC catalyst composition.

In some embodiments, the second component includes a phase composition that includes from any of about 1 wt %, about 3 wt %, about 5 wt %, about 8 wt %, about 10 wt %, about 15 wt %, about 20 wt %, or about 25 wt % to any of about 30 wt %, about 35 wt %, about 40 wt %, about 45 wt %, about 50 wt %, about 55 wt %, about 60 wt %, about 70 wt %, or about 80 wt %, beta zeolite, based on total weight of the second component. In certain embodiments, the second component includes at least about 10 wt % to about 60 wt %, about 15 wt % to about 55 wt %, about 20 wt % to about 50 wt %, or about 25 wt % to about 45 wt %, or any sub-range or single value therein, beta zeolite, based on total weight of the second component. In some embodiments, the second component includes phase composition of about 10 wt % to about 60 wt % beta zeolite, based on total weight of the second component. In some embodiments, the second component includes phase composition of about 15 wt % to about 55 wt % beta zeolite, based on total weight of the second component. In some embodiments, the second component includes about 25 wt % to about 45 wt % beta zeolite based on total weight of the second component. In some embodiments, the second component includes about 1 wt % to about 20 wt % beta zeolite, based on total weight of the second component. In some embodiments, the second component includes about 2 wt % to about 15 wt % beta zeolite, based on total weight of the second component. In some embodiments, the second component includes about 3 wt % to about 8 wt % beta zeolite, based on total weight of the second component.

In some embodiment described herein, the second component includes $AlPO_4$. Without being construed as limiting, it is believed that the $AlPO_4$ is formed due to the inclusion of boehmite during the preparation process of the second component. Without being construed as limiting, it is believed that, at constant oxidized phosphorus (e.g., $P_2O_5$) loading, increased amounts of boehmite could adversely affect the beta zeolite structure by scavenging P that might otherwise have stabilized the beta zeolite structure. It is also believed that the amount of boehmite contributes to the attrition resistance of the second component. In particular, it is believed that greater amounts of boehmite may enhance the attrition resistance of the second component. Hence, the amount of boehmite used in the preparation of the second component may be tuned to be sufficiently high to generate attrition resistant second component while not being too high de-stabilize or otherwise adversely affect the beta zeolite structure. The boehmite alumina in the second component may, in certain embodiments, be different from the boehmite alumina that is used in the first component.

In certain embodiments, the boehmite amount added during the preparation of the second component is sufficient to form a second component having an air jet attrition rate (AJAR), as measured according to ASTM D 5757, that is less than about 5 wt %/hr, less than about 4.5 wt %/hr, or less than about 4 wt %/hr.

In certain embodiments, the amount of $AlPO_4$ in the second component may range from any of about 1 wt %, about 2 wt %, about 3 wt %, about 4 wt %, about 5 wt %, about 6 wt %, about 7 wt %, about 8 wt %, about 9 wt %, about 10 wt %, about 11 wt %, or about 12 wt % to any of about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt %, based on total weight of the second component. In some embodiments, the amount of $AlPO_4$ in the second component ranges from about 1 wt % to about 25 wt %, from about 5 wt % to about 23 wt %, from about 10 wt % to about 20 wt %, or from about 13 wt % to about 17 wt %, or any sub-range or single value therein, based on total weight of the second component.

In some embodiments, the second component includes one or more of oxidized phosphorus (e.g., $P_2O_5$), phosphate treated constituent (PT), or a silica-alumina binder. In one embodiment, the second component includes oxidized phosphorus (e.g., $P_2O_5$). In one embodiment, the second component includes a phosphate treated constituent (PT). In one embodiment, the second component includes a silica-alumina binder.

Without being construed as limiting, it is believed that the binder type may indirectly contribute to the Brönsted acidity of the second component, which may be a reflection of the butylenes related activity of the second component. It was observed, in certain embodiments, that a second component that included oxidized phosphorus (e.g., $P_2O_5$) had a higher Brönsted acidity than a second component that included a silica-alumina binder. It was further observed, in certain embodiments, that a second component that included a silica-alumina binder had a higher Brönsted acidity than a second component that included P treated beta zeolite. In certain embodiments, the Brönsted acidity of the second component may range from about 10 μmol/g to about 65 μmol/g, from about 25 μmol/g to about 60 μmol/g, or about 35 μmol/g to about 55 μmol/g, or any sub-range or single value therein. In certain embodiments, the second component includes oxidized phosphorus (e.g., $P_2O_5$) and has a Brönsted acidity of about 35 μmol/g to about 55 μmol/g. In certain embodiments, the second component includes a silica-alumina binder and has a Brönsted acidity of about 25 μmol/g to about 40 μmol/g. In certain embodiments, the second component includes P treated beta zeolite and has a Brönsted acidity of about 10 μmol/g to about 25 μmol/g.

In certain embodiments, the second component includes oxidized phosphorus (e.g., $P_2O_5$) in an amount of from any of about 1 wt %, about 2 wt %, about 3 wt %, about 4 wt %, about 5 wt %, about 6 wt %, about 7 wt %, about 8 wt %, about 9 wt %, or about 10 wt % to any of about 11 wt %, about 12 wt %, about 13 wt %, about 14 wt %, about 15 wt %, about 16 wt %, about 17 wt %, about 18 wt %, about 19 wt %, or about 20 wt %, based on total weight of the second component. In certain embodiments, the second component includes oxidized phosphorus (e.g., $P_2O_5$) in an amount of about 1 wt % to about 30 wt %, about 2 wt % to about 25 wt %, about 5 wt % to about 20 wt %, or any sub-range or single value therein, based on total weight of the second component. Without being construed as limiting, it is believed that the inclusion of oxidized phosphorus (e.g., $P_2O_5$) in the second component reduces the amount/dose of second component required to give a 1 wt % of incremental increase in overall butylenes yield, as quantified upon contacting the second component with a hydrocarbon feed, when compared to the amount/dose required to generate a similar butylenes yield improvement with an identical second component that does not include oxidized phosphorus (e.g., $P_2O_5$).

In certain embodiments, the second component is substantially free of the metal passivating constituent from the first matrix (e.g., substantially free of a transitional alumina such as gamma alumina, delta alumina, or a combination thereof). The term "substantially free," as used herein, refers to the second component having less than about 5 wt %, less than about 4 wt %, less than about 3 wt %, less than about 2 wt %, less than about 1 wt %, or 0 wt % metal passivating constituent of the first matrix, based on the total weight of the second component. Without being construed as limiting, it is believed that the combination of beta zeolite, oxidized phosphorus such as $P_2O_5$ (or a different P based component), and transitional alumina (such as gamma alumina, delta alumina, or a combination thereof) adversely effects/diminishes the performance of beta zeolite. Hence, in certain embodiments, the second component includes a combination of beta zeolite and oxidized phosphorus (e.g., $P_2O_5$) or a combination of beta zeolite and the metal passivating constituent from the first matrix (e.g., transitional alumina such as gamma alumina, delta alumina, or a combination thereof) but not the combination of oxidized phosphorus (e.g., $P_2O_5$) and the metal passivating constituent from the first matrix (e.g., transitional alumina such as gamma alumina, delta alumina, or a combination thereof). In one embodiment, the second component includes beta zeolite and oxidized phosphorus (e.g., $P_2O_5$) while being substantially free of the metal passivating constituent from the first matrix (e.g., transitional alumina such as gamma alumina, delta alumina, or a combination thereof). In one embodiment, the second component includes beta zeolite, the metal passivating constituent from the first matrix (e.g., transitional alumina such as gamma alumina, delta alumina, or a combination thereof), and optionally a silica-alumina binder.

The silica to alumina ratio (SAR) in the beta zeolite in the second component ranges from any of about 20, about 25, about 30, or about 35 to any of about 40, about 50, about 75, about 100, about 150, about 200, about 250, or about 300. In certain embodiments, the SAR in the zeolite in the second component is from about 20 to about 300, from about 25 to about 100, from about 30 to about 50, or from about 30 to about 40. In certain embodiments, the second component is treated with phosphoric acid to bind oxidized phosphorus (e.g., $P_2O_5$) thereto and the beta zeolite has a SAR that is greater than about 30. Without being construed as limiting, it is believed that the SAR can be an important parameter which affects beta zeolite stability and activity. The SAR value should balance between maintaining the stability of the beta zeolite structure and the butylenes activity thereof.

The adverse effect on the beta zeolite may be evidenced by the zeolite surface area (ZSA) of the second component prior to steaming, the steamed zeolite surface area (SZSA) of the second component, and/or the comparison between the SZSA and the ZSA of the second component.

In certain embodiments, the ZSA of the second component ranges from any of about 50 m²/g, about 75 m²/g, about 100 m²/g, about 110 m²/g, or about 120 m²/g to any of about 130 m²/g, about 140 m²/g, about 150 m²/g, about 170 m²/g, about 180 m²/g, about 200 m²/g, about 250 m²/g, or about 300 m²/g. In some embodiments, the ZSA of the second component ranges from about 50 m²/g to about 300 m²/g, from about 75 m²/g to about 200 m²/g, from about 100 m²/g to about 180 m²/g, from about 120 m²/g to about 170 m²/g, or from about 110 m²/g to about 130 m²/g, or any sub-range or single value therein.

In certain embodiments, the SZSA of the second component, after steaming in 100% steam at 1450° F. for 24 hours, ranges from any of about 50 m²/g, about 60 m²/g, about 70 m²/g, about 75 m²/g, about 80 m²/g, about 90, or about 100 m²/g, to any of about 110 m²/g, about 120 m²/g, about 130 m²/g, about 140 m²/g, about 150 m²/g, about 170 m²/g, about 180 m²/g, about 200 m²/g, about 250 m²/g, or about 300 m²/g. In some embodiments, the SZSA of the second component, after steaming in 100% steam at 1450° F. for 24 hours, ranges from about 50 m²/g to about 300 m²/g, from about 75 m²/g to about 140 m²/g, from about 90 m²/g to about 120 m²/g, or from about 100 m²/g to about 110 m²/g, or any sub-range or single value therein.

In certain embodiments, a majority of the ZSA of the second component is retained after steaming. For instance, at least about 65%, at least about 70%, at least about 75%, at least about 80%, at least about 85%, at least about 90%, or from about 80 to about 90%, of the ZSA of the second component is maintained after steaming in 100% steam at 1450° F. for 24 hours. Without being construed as limiting, it is believed that increasing the content of oxidized phosphorus (e.g., P₂O₅) in the second component improves beta zeolite structure retention, as evidenced at least by the comparison of SZSA to ZSA.

Without being construed as limiting, it is believed that the butylenes activity (quantified as amount of butylenes per dose of the second component that is generated upon contacting at least the second component with a hydrocarbon feed), increases with increasing oxidized phosphorus (e.g., P₂O₅) content and/or with increased ZSA and/or with increased SZSA.

In certain embodiments, the second matrix of the second component further includes kaolin. In certain embodiments, the second component includes beta zeolite in combination with kaolin, AlPO₄ formed from boehmite and phosphoric acid, and oxidized phosphorus (e.g., P₂O₅) while being substantially free of the metal passivating constituent from the first matrix (e.g., transitional alumina such as gamma alumina, delta alumina, or a combination thereof).

In some embodiments, the second component's average particle size may be from about 30 to about 250 micrometers. In some embodiments, the second component's average particle size may be from about 60 to about 100 micrometers. In some embodiments, the second component has an average particle size of about 60 to about 90 micrometers. In some embodiments, the second component has an average particle size of about 60 to about 80 micrometers.

In certain embodiments, the second component may be formed by slurry blending beta zeolite with a second non-zeolitic material to form a slurry. The second non-zeolitic material (also referred to as second matrix) may include boehmite alumina and kaolin in certain embodiments. In other embodiments, the second non-zeolitic material (or second matrix) may include boehmite alumina, α-alumina, and kaolin. The process of forming the second component may also include spray drying the slurry.

In certain embodiments, the process of forming the second component may also include adding (e.g., injecting) phosphoric acid (H₃PO₄) during the spray drying.

As indicated earlier, the amount of boehmite and the amount of phosphoric acid that is added during the preparation of the second component is tuned to generate a second component that maintains its zeolite structure (evidenced by ZSA and SZSA), maintains its attrition resistance (evidenced by AJAR), and maintains its activity (evidenced by total butylenes yield). In certain embodiments, the amount of boehmite added to the slurry ranges from any of about 1 wt %, about 2 wt %, about 3 wt %, about 4 wt %, or about 5 wt % to any of about 6 wt %, about 7 wt %, about 8 wt %, about 9 wt %, or about 10 wt %, based on total weight of the slurry. In some embodiments, the amount of boehmite added to the slurry is from about 1 wt % to about 10 wt %, from about 3 wt % to about 9 wt %, or from about 5 wt % to about 8 wt %, or any sub-range or single value therein, based on the total weight of the slurry.

In certain embodiments, the process of forming the second component includes calcining the spray dried, and optionally oxidized phosphorus (e.g., P₂O₅) containing, second microspheroidal FCC catalyst material, to form the second component. In some embodiments, the calcining is conducted for at least about two hours. Such calcining may be conducted at a temperature of from about 500° C. to about 900° C., or about 700° C. The calcination temperature and duration should not be construed as limiting. Under various circumstances, other calcination durations and temperatures may be utilized.

The method may further include steam-treating the second component. In some embodiments, the steam-treating is conducted at a temperature of at least about 700° C. In some embodiments, the steam-treating is conducted for at least about four hours. In some embodiments, the steam-treating is conducted for about one to about 24 hours. The steam treatment temperature and duration should not be construed as limiting. Under various circumstances, other steam treatment durations and temperatures may be utilized.

Third Component

Embodiments described herein provide a FCC catalyst composition, which uses one or more boron oxide components for metal, particularly, nickel passivation. The presence of boron oxide in a fluid catalytic cracking catalyst as a trapping/passivating material results in lower hydrogen and coke yields when processing heavy hydrocarbons feeds, particularly resid feeds, contaminated with transition metals. Passivating or passivation refers to the ability of the boron component to reduce or prevent the activity of deleterious metals (such as nickel) from negatively impacting the selectivity of the FCC process. Provided herein are FCC catalysts, methods of making FCC catalysts, and methods of cracking hydrocarbon feeds.

In one or more embodiments, the one or more boron oxide components are mobile under the fluid catalytic cracking conditions. As used herein, "mobile," refers to the ability of boron to move within and between particle types in the FCC unit. According to certain embodiments, the one or more boron oxide components form a complex with the one or more metals. As used herein, "complex" means that the one or more boron oxide components associate with one or metals either by some type of chemical interaction, whether by van der Waals forces or chemical bonding. Thus, as used herein, the one or more boron components may form a compound or chemical composition with the metals, but the invention should not be limited to the one or more boron components bonding with metals. The one or more boron components should interact with the metals, for example nickel, such that the nickel does not negatively impact the desired reactions, and providing a catalytic process with increased selectivity and decreased formation of coke and hydrogen. Therefore, by forming a "complex," the one or more boron oxides are active in trapping metals, as opposed boron components that are inactive or have no activity in trapping metals.

In certain embodiments, a third component that includes boron oxide-containing particles is made utilizing the in-situ processes described in U.S. Pat. Nos. 5,559,067 and 6,716,338, which are herein incorporated by reference in their entireties. Boron oxide can be incorporated during particle manufacture at various stages of the process. For example, boron oxide can be incorporated during particle formation such as during spray drying, after particle formation such as during calcination or during ion exchange of the zeolite after the particles are formed.

In certain embodiments, boron oxide-modified component can be made by spray drying a mixture of mullite, hydrous kaolin, and a suitable binder, for example, a silicate binder, and then modified with one or more boron oxide constituents. In one or more embodiments, the boron can be added during spray-drying (e.g., one or more boron oxide components are mixed with the third matrix and spray dried to form the particles). In other embodiments, one or more boron oxide components are spray loaded onto FCC compatible inorganic particles. The loading can occur by a variety of techniques such as impregnation, spray-coating, etc.

In certain embodiments, a third component that includes boron oxide-containing particles can be prepared by impregnating a third matrix with boron. As used herein, the term "impregnated" means that a boron containing solution is put into pores of a material, such as a non-zeolitic component (also referred to herein as a third matrix). Alternatively, the boron containing solution may be put into pores of a zeolite.

In still further embodiments, one or more boron oxide components are added to non-zeolitic particles during calcination of the particles. The spray dried particles are formed in the usual way, and the one or more boron oxide components can be added during calcination.

In an alternative embodiment, boron can be added to the zeolite containing particles during ion exchange.

In certain embodiments, the boron oxide modified component may also include a transition alumina and a zeolite. The boron oxide modified component may further include a rare earth constituent and/or a phosphorus constituent.

Other third matrix constituents may include kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia, sepiolite, and a combination thereof.

A third component that includes boron oxide containing particles may be present in the FCC catalyst composition in an amount in the range of 0.1% and 20% by weight, including from any of about 0.1%, about 0.5%, about 1%, about 2%, about 3%, about 4%, about 5%, about 6%, about 7%, about 8%, about 9%, or about 10% to any of about 11%, about 12%, about 13%, about 14%, about 15%, about 16%, about 17%, about 18%, about 19%, or about 20%, by weight based on the total weight of the FCC catalyst composition.

Fourth Component

The fourth component may be a metal passivator or trap. The metal passivator/trap of the present disclosure may be in the form of discrete particles and, as used in the present disclosure, may comprise one rare earth oxide or a mixture of rare earth oxides. Where the discrete particle comprises one rare earth oxide, the rare earth oxide may be lanthanum or cerium. Although the composition will be referred to as a rare earth oxide, it is believed that the actual trapping component is a mixture of oxide and rare earth aluminate salts. Accordingly, the term "rare earth oxide" as used herein is meant to include rare earth aluminate salts. Where the discrete particles comprise a mixture of rare earth oxides, the mixture may include lanthanum or cerium and at least one member of the lanthanide series, preferably one or more of the lighter lanthanides, i.e., lanthanum, cerium, praseodymium, neodymium, promethium, or samarium.

The rare earth oxides in the discrete particles of the present invention are formed by one of several processes. In the first process, inert matrix particles (i.e., fourth matrix) are impregnated with a rare earth salt and the impregnated particles then calcined in an oxygen-containing atmosphere to convert the salt to the rare earth oxide. Although not limited to water soluble salts, such materials are preferred and are well known in the art and include acetates, halides, nitrates, sulfates and the like. Lanthanum nitrate is a particularly useful rare earth salt. Incipient wetness techniques can be used to impregnate the inert matrix with the rare earth salt.

In an alternative process, a rare earth salt or oxide is spray dried with an inert matrix precursor to form a particle containing a mixture of matrix and rare earth. The particle mixture can be calcined to convert any rare earth salt to oxide. In this embodiment, it is preferred that the rare earth salt be a solid such as, for example, rare earth carbonate.

The amount of rare earth oxide in the discrete particles is not critical. The amount of rare earth oxide in the discrete particles may be as little as about 5%, but is preferably at least about 15%, and, more preferably, at least about 25% by weight of the discrete particles. In general, the greater the amount of rare earth in the discrete particle, the better will be the improvement in catalyst performance.

The inert material, which forms the fourth matrix of the fourth component (i.e., the discrete particle of the passivator/trap of this disclosure), is important in that the fourth matrix must have sufficient attrition resistance to maintain the integrity of the particle during the cracking and regenerating steps of the cracking process. Inert means inactive or significantly less active than the cracking catalyst that is used in the catalytic cracking process.

If the trap of this disclosure is formed by the first process as disclosed above, the inert material which forms the fourth matrix of the passivator/trap of the present disclosure is to be formed from hydrous kaolin which has been heated to a temperature above 1,050° C., thus, at a temperature beyond the characteristic exotherm of kaolin to yield a sufficient amount of mullite. The mullite-containing particle has improved properties of attrition resistance. Thus, hydrous kaolin is calcined at a temperature above that designated, and at a time sufficient to yield a mullite index of at least 15, and, preferably, a mullite index of at least 35. Mullite index is a quantitative x-ray diffraction method used to quantify the amount of mullite in a material. The quantification is done by integrating the area of a peak, or peaks, and comparing the integrated peak intensity of the unknown sample to a calibration curve. The calibration curve is typically formed by running samples consisting of 10% increments of mullite from 0% to 100%. Thus, a mullite index of 35 indicates that the sample contains about 35% mullite. Since mass absorption or preferred orientation typically are not taken into account, the mullite index value cannot exactly be termed as percent, but can be used in a relative sense as a useful percent range of mullite in the sample. In general, after calcination, the inert matrix typically has from 40-60% $SiO_2$ and 60-40% $Al_2O_3$.

In an alternative process, the spray dried particulate mixture of inert matrix precursor, i.e. hydrous kaolin, and rare earth salt or oxide and, optionally, a binder is calcined to convert any rare earth salt to the oxide thereof. Accordingly, much lower calcination temperatures can be used in the alternative process than used in the first process which transforms the hydrous kaolin to a spinel containing a mullite phase. In this alternative case, the attrition resistance is provided by the hydrous kaolin and any binder included in the mixture which is spray dried. After any conversion of rare earth salt to oxide, the inert matrix will have from 40-60% $SiO_2$ and 60-40% $Al_2O_3$.

The process for forming the fourth component (i.e., passivator/trap of the present disclosure) involves spray drying a hydrous kaolin slurry, typically comprising 40-60 wt. % kaolin solids in water. The slurry can be formed by adding a small amount of clay dispersant such as tetrasodium pyrophosphate and then mixing using high sheer. By employing the dispersant or deflocculating agent, the spray drying can be conducted with higher proportions of solids, which generally leads to a harder product. With deflocculating agents, it is possible to produce hydrous kaolin suspensions which contain about 55-60% solids. In the alternative process, the rare earth salt or oxide, and binder, such as colloidal silica are also mixed with the kaolin slurry. If as preferred, the rare earth salt is a solid, the solid salt can be first formed as a slurry in water and then subsequently added to the hydrous kaolin slurry along with binder. Additional useful binders include sodium silicate, peptizable alumina, etc.

Subsequent to the formation of the spray dried hydrous kaolin particles, the particles are heated in air. It is well-known that when kaolin is heated in air, a first transition occurs at about 550° C. associated with an endothermic dehydroxylation reaction. The resulting materials are generally referred to as metakaolin. Metakaolin persists until the material is heated to about 975° C. and begins to undergo an exothermic reaction. This material is frequently described as kaolin which has undergone the characteristic exothermic reaction. Some authorities refer to this material as a defect aluminum-silicon spinel or as a gamma-alumina phase. On further heating to about 1,050° C., a high temperature phase, including mullite begins to form. The extent of conversion to mullite is dependent on a time/temperature relationship and the presence of mineralizers, as is well known in the art. Under the first process of this invention, the temperature of calcination and time is sufficient to convert at least a portion of the spray dried hydrous kaolin particles to a spinel and yield a mullite index of at least 15, and, preferably, a mullite index of at least about 35.

Subsequent to the calcination of the kaolin microsphere to a particle containing mullite, the particle is then impregnated with the rare earth salt such as the lanthanum salt, typically lanthanum nitrate by the incipient wetness method. Continued impregnations can be accomplished until the amount of lanthanum oxide formed in the particle is at least about 10 weight percent, subsequent to calcination. Thus, after the particle has been impregnated with sufficient rare earth salt, the impregnated particle is then calcined at a temperature of at least 350° C. for a time sufficient to convert the salt to the rare earth oxide form.

Under the alternative process, the spray dried particles containing a mixture of hydrous kaolin, rare earth salt or oxide and binder are calcined in an oxygen-containing atmosphere to convert any rare earth salt to the oxide thereof. Excessive temperatures are to be avoided. Thus, the temperature should be sufficient to convert the salt to the oxide and prevent further reaction of the rare earth metals and the matrix or binder, although minor reactions are acceptable. Typically, the temperature of calcination will be below 975° C., and preferably below 550° C. to maintain the kaolin in hydrated form.

The fourth component described herein is useful for cracking oil feed containing a level of metal contaminants (i.e. Ni and/or V), having concentrations in the range of about 0.1 ppm of nickel and/or 0.1 ppm of vanadium, to about 200 ppm of metal contaminants comprising Nickel, Vanadium, Iron, and/or mixture thereof. However, it must be noted that during the FCC cracking, the amount of metal contaminants accumulated on the FCC catalyst can be as minimally as 300 ppm to as high as 40,000 ppm of metal contaminants comprising Nickel, Vanadium, Iron, and/or mixture thereof.

A fourth component that includes metal trap or passivator particles may be present in the FCC catalyst composition in an amount in the range of 0.1% and 20% by weight, including from any of about 0.1%, about 0.5%, about 1%, about 2%, about 3%, about 4%, about 5%, about 6%, about 7%, about 8%, about 9%, or about 10% to any of about 11%, about 12%, about 13%, about 14%, about 15%, about 16%, about 17%, about 18%, about 19%, or about 20%, by weight based on the total weight of the FCC catalyst composition.

Additional Zeolite Containing Components

The FCC catalyst compositions described herein may further include at least one additional zeolite containing component. The at least one additional zeolite containing component may be compositionally different from the first component and from the second component (and from the third component and from the fourth component if any of them is present).

In certain embodiments, the at least one additional zeolite containing component may include (1) large pore zeolites (e.g., those having pore openings greater than about 7 Angstroms) such as, for example, USY, REY, silicoaluminophosphates SAPO-5, SAPO-37, SAPO-40, MCM-9, metalloaluminophosphate MAPO-36, aluminophosphate VPI-5, or mesoporous crystalline material MCM-41; REUSY, zeolite Z, zeolite Y, dealuminated zeolite Y, silica-enriched dealuminated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, MCM-68, ZSM-11, ZSM-5, ZSM-11 intermediates, ZSM-12, ZSM-22, ZSM-23, ZSM-35, ZSM-38, ZSM-48, ZSM-57 silicoaluminophosphate SAPO-31 and (3) small pore zeolites (e.g., those having pore openings of less than about 4 Angstroms) such as, for example, erionite and ZSM-34.

In certain embodiments, the at least one additional zeolite containing component may include zeolite A, zeolite B, zeolite F, zeolite H, zeolite K-G, zeolite L, zeolite M, zeolite Q, zeolite R, zeolite T, mordenite, erionite, offretite, ferrierite, chabazite, clinoptilolite, gmelinite, phillipsite and faujasite.

Hydrothermally and/or chemically modified versions of many of the components described above may also be suitable as the at least one additional component in the FCC catalyst compositions contemplated herein.

In some embodiments, the at least one additional zeolite containing component may include at least one zeolite selected from ZSM-5, mordenite, ferrierite, MCM-22, MCM-68, Y-zeolite, beta zeolite, or a combination of two or more thereof. In one embodiment, the at least one additional component includes ZSM-5 zeolite.

The at least one additional zeolite containing component may be present in the FCC catalyst composition in an amount in the range of 0.1% and 10% by weight, including from any of about 0.1%, about 0.5%, about 1%, about 2%, about 3%, about 4%, or about 5% to any of about 6%, about 7%, about 8%, about 9%, or about 10%, by weight, based on the total weight of the FCC catalyst composition.

FCC Catalyst Composition

In certain embodiments, the instant disclosure is directed to an FCC catalyst composition that includes any of the first components described herein in combination with any of the second components described herein. The first component and the second component may be formulated as separate microspheroidal catalysts, e.g., a first microspheroidal FCC catalyst and a second microspheroidal FCC catalyst. The first microspheroidal FCC catalyst could include Y zeolite and a first matrix that includes a metal passivating constituent and the second microspheroidal FCC catalyst could include beta zeolite and a second matrix. In certain embodiments, the first component may be a Y zeolite as described herein.

In alternative embodiments, the first component may be any other base cracking catalyst having a significant activity (e.g., zeolite Y, dealuminated zeolite Y, silica-enriched dealuminated zeolite Y, REY, USY, CREY, REUSY, and the like). For instance, additional suitable first components may be described generally as a catalyst containing a crystalline aluminosilicate, ammonium exchanged and at least partially exchanged with rare earth metal cations, and sometimes referred to as "rare earth-exchanged crystalline aluminum silicate," i.e. REY, CREY, or REUSY; or one of the stabilized ammonium or hydrogen zeolites.

In certain embodiments, the FCC catalyst composition may include at least one additional component. In certain embodiments, the at least one additional component may include a boron oxide component (e.g., third component), a metal trap or passivator (e.g., fourth component), or a combination thereof. In one embodiment, the FCC catalyst composition includes a boron oxide component (e.g., any of the third components described herein). In one embodiment, the FCC catalyst composition includes a metal trap or passivator (e.g., any of the fourth components described herein). In one embodiment, the FCC catalyst composition includes a boron oxide component (e.g., any of any of the fourth components described herein). In certain embodiments, the at least one additional component may include one or more of the at least one zeolite containing components described herein.

The FCC catalyst composition may be formed by blending or mixing (e.g., physically mixing) any of the first components described herein and any of the second components described herein. The FCC catalyst composition may be further formed by blending or mixing (e.g., physically mixing) any of the at least one additional components described herein (e.g., any of the third components described herein and/or any of the fourth components described herein and/or any of the additional zeolite containing components described herein).

The various components are formulated as separate and distinct particles, which may be add to the FCC catalyst composition as needed to provide a customized catalyst solution. The FCC catalyst composition may be designed to exhibit enhanced performance, such as improved total butylenes yield, improved butylenes to propylene selectivity ratio, prevent metal contaminants from interfering with catalyst activity and selectivity, reduced coke and hydrogen yield, and enhanced zeolite stability.

For instance, the first components described herein include a metal passivating constituent. The metal passivating constituent in the first component is believe to be boehmite alumina that has been calcined at 1350-1500° F. to form about 15 wt % to about 20 wt % transitional alumina (e.g., gamma alumina, delta alumina, or a combination thereof). This metal passivating constituent provides for a built in metal (e.g., Ni) passivation ability in the first component. Hence, the amount of the first component in the FCC catalyst composition may be adjusted to provide significant cracking activity combined with metal passivation ability (which is believed to reduce production of unwanted coke and dry gas in FCC).

The second components described herein are believed to improve the conversion, improve the total butylenes yield, and to improve the butylenes to propylene selectivity ratio, all while maintaining or reducing the yield and/or selectivity of less desired products, such as coke. Hence, the amount of the second component in the FCC catalyst composition may be adjusted to provide improved butylenes related activity without generating less desirable products.

The third and fourth components described herein are believed to passivate or trap metal contaminants, such as Ni and V. Ni passivation or trapping reduces formation of unwanted coke and dry gas in FCC. V passivation or trapping reduces the vanadium's ability to destroy the zeolite and to reduce catalytic activity. Hence, the amounts of these components may be tuned, as needed, to achieve Ni and V passivation or trapping provides for improved activity, reduced formation of undesired and harmful products (e.g., coke and hydrogen), and increased zeolite stability (through e.g., zeolite surface area stabilization). For example, resid feeds have higher metals content than other types of hydrocarbon feeds, which may require more of the third and/or fourth components than other hydrocarbon feeds that have lower metals content.

The at least one additional zeolite containing component may be added to improve the activity of the FCC catalyst composition through the combination of multiple framework structures.

Any of the first components described herein may be added to the FCC catalyst composition in an amount ranging from any of about 10 wt %, about 15 wt %, about 20 wt %, about 25 wt %, about 30 wt %, about 35 wt %, about 40 wt %, about 45 wt %, or about 50 wt % to any of about 55 wt %, about 60 wt %, about 65 wt %, about 70 wt %, about 75 wt %, about 80 wt %, about 85 wt %, or about 90 wt %, based on total weight of the FCC catalyst composition. In certain embodiments, the first component is added to the FCC catalyst composition in an amount ranging from about 30 wt % to about 90 wt %, from about 50 wt % to about 85 wt %, from about 70 wt % to about 80 wt %, or any sub-range or single value therein, based on total weight of the FCC catalyst composition.

Any of the second components described herein may be added to the FCC catalyst composition in an amount ranging from any of about 0.1 wt %, about 0.3 wt %, about 0.5 wt %, about 0.8 wt %, about 1 wt %, about 2 wt %, about 3 wt %, about 4 wt %, or about 5 wt % to any of about 6 wt %, about 7 wt %, about 8 wt %, about 9 wt %, about 10 wt %, about 12 wt %, about 15 wt %, or about 20 wt %, based on total weight of the FCC catalyst composition. In certain embodiments, the second component may be added to the FCC catalyst composition in an amount ranging from about 0.1 wt % to about 20 wt %, from about 1 wt % to about 15 wt %, from about 2 wt % to about 10 wt %, or any sub-range or single value therein, based on total weight of the FCC catalyst composition.

In certain embodiments, the amount of the first component in the FCC catalyst composition is greater than the amount of the second component. For instance, the wt:wt ratio of the first component to the second component in the FCC catalyst composition may range from about 20:1 to about 1.5:1, from about 15:1 to about 3:1, or from about 13:1 to about 5:1. It is believed, without being construed as limiting, that such ratios contribute to improved conversion, butylenes to propylene selectivity ratio, and total butylenes yield, while maintaining or reducing the yield and/or selectivity of less desired products, such as coke and hydrogen, passivating or trapping metal contaminants, and increasing zeolite stability.

In certain aspects, the instant disclosure is directed to a method of cracking a hydrocarbon feed by contacting the feed with any of the FCC catalyst compositions described in this disclosure. For instance, in certain embodiments, the method of cracking a hydrocarbon feed includes contacting the feed with a FCC catalyst composition that includes a first component (including Y zeolite and a first matrix including metal passivating constituent), a second component (including beta zeolite and a second matrix), and optionally at least one additional component (such as any of the third components described herein, any of the second components described herein, and/or any of the additional zeolite containing components described herein).

In certain embodiments, the methods of cracking a hydrocarbon feed, as described herein, result in an average butylenes to propylene selectivity ratio that is greater than about 0.7, greater than about 0.8, greater than about 0.85, greater than about 0.9, or greater than about 0.95, or about 1. In one embodiment, the method of cracking a hydrocarbon feed, as described herein, results in an average butylene to propylene selectivity ratio that is greater than about 0.7. In one embodiment, the method of cracking a hydrocarbon feed, as described herein, results in an average butylenes to propylene selectivity ratio that is greater than about 0.8. In one embodiment, the method of cracking a hydrocarbon feed, as described herein, results in an average butylenes to propylene selectivity ratio that is greater than about 0.85. In one embodiment, the method of cracking a hydrocarbon feed, as described herein, results in an average butylenes to propylene selectivity ratio that is greater than about 0.9. In one embodiment, the method of cracking a hydrocarbon feed, as described herein, results in an average butylenes to propylene selectivity ratio that is greater than about 0.95. In one embodiment, the method of cracking a hydrocarbon feed, as described herein, results in an average butylenes to propylene selectivity ratio that is about 1.

The butylenes activity of each component may be assessed from a total butylenes versus component dose plot. The slope of the total butylenes versus component dose plot may be used to interpolate the component dosage required to obtain a certain weight percent (e.g., 0.5 wt % or 1 wt %) incremental butylenes increase. The butylenes activity of the component that is being assessed is proportional to the reciprocal of that dosage. The butylenes to propylene selectivity ratio may be assessed from the slope of the total butylenes (TC4=in wt %) versus propylene (C3=in wt %) plot.

In certain embodiments, the methods of cracking a hydrocarbon feed, as described herein, maintain an average butylenes to propylene selectivity ratio that is within about 5%, within about 10%, or within about 15% of the average butylenes to propylene selectivity ratio obtained when contacting the feed with a comparative FCC catalyst composition that includes the first component (e.g., containing zeolite Y and a metal passivating constituent) without the second component (e.g., containing beta zeolite). In one embodiment, the method of cracking a hydrocarbon feed, as described herein, maintains an average butylenes to propylene selectivity ratio that is within about 5% of the average butylenes to propylene selectivity ratio obtained when contacting the feed with a comparative FCC catalyst composition that includes the first component (e.g., containing zeolite Y and metal passivating constituent) without the second component (e.g., containing beta zeolite). In one embodiment, the method of cracking a hydrocarbon feed, as described herein, maintains an average butylenes to propylene selectivity ratio that is within about 10% of the average butylenes to propylene selectivity ratio obtained when contacting the feed with a comparative FCC catalyst composition that includes the first component (e.g., containing zeolite Y and metal passivating constituent) without the second component (e.g., containing beta zeolite). In one embodiment, the method of cracking a hydrocarbon feed, as described herein, maintains an average butylenes to propylene selectivity ratio that is within about 15% of the average butylenes to propylene selectivity ratio obtained when contacting the feed with a comparative FCC catalyst composition that includes the first component (e.g., containing zeolite Y and metal passivating constituent) without the second component (e.g., containing beta zeolite). This is a substantial improvement over ZSM-5 additives which degrade the base catalyst selectivity ratio substantially.

In certain embodiments, the methods of cracking a hydrocarbon feed, as described herein, result in increase in the total butylenes of greater than about 0.2 wt %, greater than about 0.3 wt %, greater than about 0.4 wt %, or greater than about 0.5 wt %, when compared to the total butylenes generated upon contacting the feed with a comparative FCC catalyst composition that includes the first component (e.g., containing zeolite Y and metal passivating constituent) without the second component (e.g., containing beta zeolite). In certain embodiments, the method of cracking a hydrocarbon feed, as described herein, results in increase in the total butylenes of greater than about 0.2 wt % when compared to the total butylenes generated upon contacting the feed with a comparative FCC catalyst composition that includes the first component (e.g., containing zeolite Y and metal passivating constituent) without the second component (e.g., containing beta zeolite). In certain embodiments, the method of cracking a hydrocarbon feed, as described herein, results in increase in the total butylenes of greater than about 0.3 wt % when compared to the total butylenes generated upon contacting the feed with a comparative FCC catalyst composition that includes the first component (e.g., containing zeolite Y and metal passivating constituent) without the second component (e.g., containing beta zeolite). In certain embodiments, the method of cracking a hydrocarbon feed, as described herein, results in increase in the total butylenes of greater than about 0.4 wt % when compared to the total butylenes generated upon contacting the feed with a comparative FCC catalyst composition that includes the first component (e.g., containing zeolite Y and metal passivating constituent) without the second component (e.g., containing beta zeolite). In certain embodiments, the method of cracking a hydrocarbon feed, as described herein, results in increase in the total butylenes of greater than about 0.5 wt % when compared to the total butylenes generated upon contacting the feed with a comparative FCC catalyst composition that includes the first component (e.g., containing zeolite Y and metal passivating constituent) without the second component (e.g., containing beta zeolite).

In certain embodiments, the method of cracking a hydrocarbon feed, as described herein, results in constant or lower bottoms versus coke selectivity ratio when compared to the bottoms versus coke selectivity ratio upon contacting the feed with a comparative FCC catalyst composition that includes the first component (e.g., containing zeolite Y and metal passivating constituent) without the second component (e.g., containing beta zeolite).

In certain embodiments, the method of cracking a hydrocarbon feed, as described herein, results in improved butylenes activity without compromising the butylenes to propylene selectivity ratio and the selectivity of less desired products (such as bottoms, coke, and hydrogen), when compared to a comparative FCC catalyst composition that includes the first component (e.g., containing zeolite Y and metal passivating constituent) without the second component (e.g., containing beta zeolite).

In certain embodiments, the dose of second component required in the FCC catalyst composition, to increase the total butylenes upon cracking a hydrocarbon feed, ranges from about 1 wt % to about 15 wt %, from about 2 wt % to about 13 wt %, or from about 3 wt % to about 10 wt %.

In certain embodiments, the butylenes activity of the second component ranges from about 0.02 to about 0.15, from about 0.04 to about 0.14, or from about 0.05 to about 0.13. The butylenes activity is calculated as the amount of butylenes divided by the dose of the second component.

In certain embodiments, the method of cracking a hydrocarbon feed, as described herein, results, through metal passivation, in decrease of the total coke and/or hydrogen, of at least about 5 wt %, at least about 10 wt %, at least about 15 wt %, or at least about 20 wt %, when compared to contacting the feed with a FCC catalyst composition that includes the second component (e.g., beta zeolite and second matrix) without the first component (e.g., Y zeolite with a first matrix that includes a metal passivating constituent).

Also contemplated herein, in certain embodiments, is an FCC additive composition that includes a second component (including beta zeolite and a second matrix) and a third component including boron oxide. This FCC additive composition may be prepared by blending any of the second components described herein with any of the third components that include boron oxide, as described herein. This FCC additive composition may be combined with other base cracking catalysts to be employed in a method of cracking a hydrocarbon feed by contacting the feed with the FCC additive composition (and with the base cracking catalyst). The second component in the FCC additive composition may contribute to enhanced butylenes activity (e.g., improved total butylenes yield and/or improved butylenes to propylene selectivity ratio) while the third component may contribute metal trapping and passivation to reduce metal contaminants, reduce coke and hydrogen yields, and improve zeolite stability.

ILLUSTRATIVE EXAMPLES

The following examples are set forth to assist in understanding the disclosure and should not be construed as specifically limiting the invention described and claimed herein. Such variations of the invention, including the substitution of all equivalents now known or later developed, which would be within the purview of those skilled in the art, and changes in formulation or minor changes in experimental design, are to be considered to fall within the scope of the invention incorporated herein.

Example 1: Preparing A First Component

A first component was prepared as described herein and as described in U.S. Pat. No. 6,716,338 and/or in U.S. Pat. No. 10,633,596, which are incorporated herein in its entirety.

As described in U.S. Pat. No. 6,716,338 and/or in U.S. Pat. No. 10,633,596, first components that contained dispersible boehmite alumina gave substantially less hydrogen and contaminant coke than comparative catalysts that did not contain dispersible boehmite alumina.

Example 2: Preparing A Second Component

A second component was prepared as described in U.S. Pat. No. 9,227,181 (e.g., in column 9, line 23 through column 10, line 24), which is incorporated herein by reference in its entirety.

Second microspheroidal FCC catalysts (beta zeolite microspheres) with various binders were evaluated to determine the dose required for producing 0.5 wt % and 1 wt % incremental increase in total butylenes (TC4=) by ACE doping. ACE doping was used to assess the activity and selectivity of the beta zeolite microspheres. ACE doping was done at constant base catalyst/oil ratio, but with increasing levels of beta zeolite microspheres, and measuring the resulting incremental yields of butylenes and propylene. The microspheres contained 40 wt % of beta zeolite. The binders that were evaluated included boehmite and phosphoric acid ($H_3PO_4$) which ultimately formed $AlPO_4$, silica-alumina binder with ammonium phosphate treatment which may also be referred to herein as a "phosphate treated component" (PT, U.S. Pat. No. 8,940,652 B2), and silica alumina binder without ammonium phosphate treatment ($SiO_2$). The results are summarized in Table 3.

TABLE 3

| 40 wt % Beta Zeolite Microspheres Dosage for Producing 0.5 wt % and 1 wt % of Incremental Total Butylenes (TC4=) By ACE Doping | | | | |
|---|---|---|---|---|
| | Dose for 0.5 wt % TC4 = increase | Dose for 1 wt % TC4 = increase | Wt % beta crystal in FCC | Brönsted acidity (μmol/g) |
| Boehmite + $H_3PO_4$ ($AlPO_4$) | 3.95-7.20% | 9-16% | 3.9-6.2% | 40-60 |
| PT | 9-18.4% | 37% | 15% | 15-25 |
| $SiO_2$ | 7-24.4% | 49% | 20% | 25-40 |

The results in Table 3 show that the boehmite and phosphoric acid binder ($AlPO_4$) reduced the required additive dose (i.e., required amount of beta zeolite microspheres) for producing a 0.5 wt % and 1 wt % of incremental increase in total butylenes yield (TC4=) and improved the butylenes activity and increased Brönsted acidity values. This has the advantage of forming a more economical second microspheroidal FCC catalyst as it would allow usage of a lower amount of the second microspheroidal FCC catalyst in the FCC catalyst composition, while also utilizing a lower zeolite beta crystal in the catalyst composition.

Figure 2:
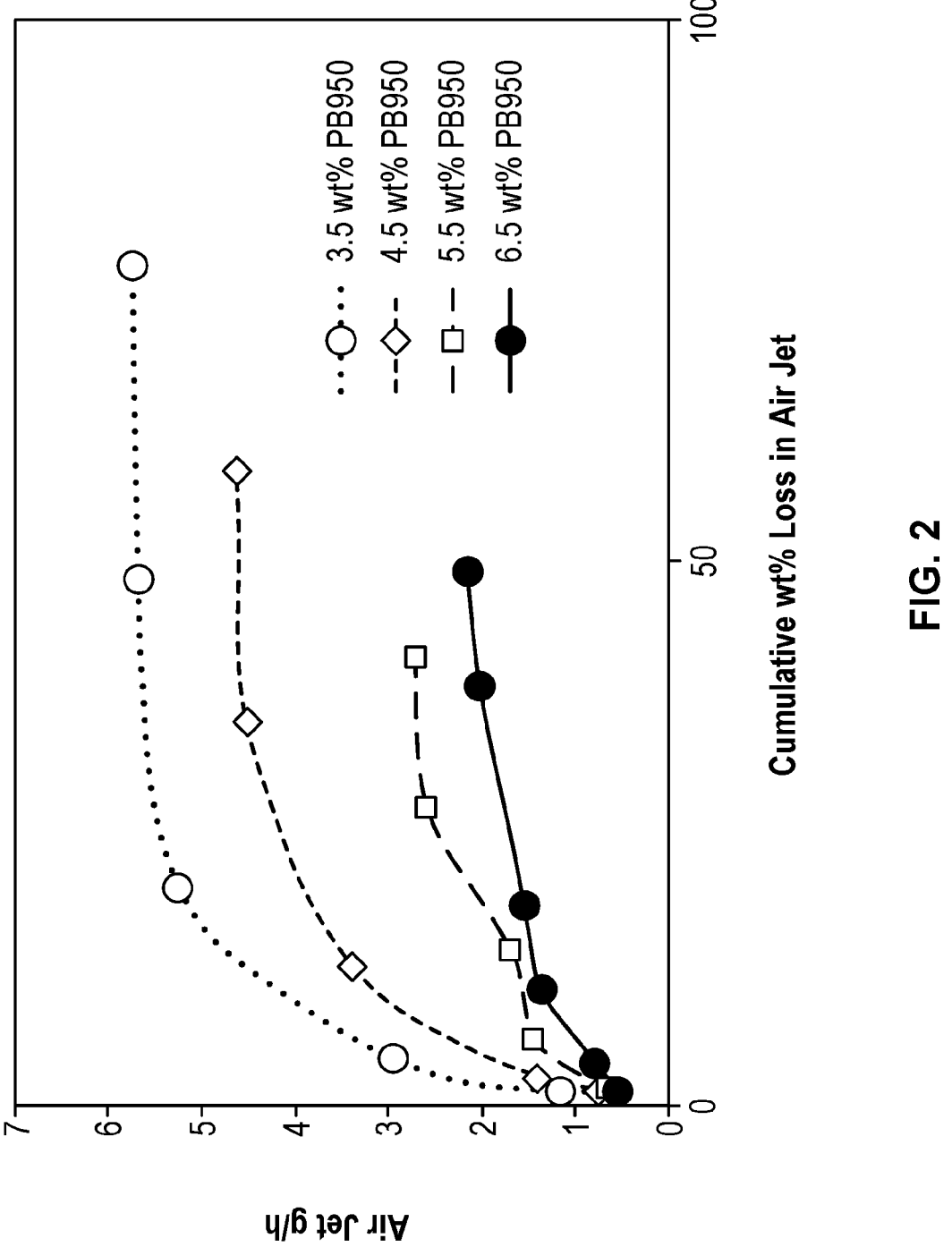
FIG. 2 depicts a scatter plot of attrition jet index (AJI) and air jet attrition rate (AJAR) of the second component as a function of boehmite alumina content (on a volatile-free (VF) basis) used to form the second component.

Example 3: Effect of Boehmite and $P_2O_5$ on Attrition and Butylene Activity in Second Component The effect of $P_2O_5$ and boehmite on butylene activity and attrition of the second component was evaluated by varying boehmite (Alumax PB950) and $P_2O_5$ simultaneously in a statistically designed experiment. Samples with boehmite content of 3.5 wt %, 4.5 wt %, and 5.5 wt % were tested over a range of 10.2 to 12.7 wt % $P_2O_5$. As can be seen in Table 4 and in FIG. 2, lowering the boehmite content affected the attrition of the second component, evidenced by increased air jet attrition rate (AJAR) and air jet index (AJI). Statistical analysis showed that the attrition resistance could be fitted with a simple quadratic in VF boehmite, and that $P_2O_5$ played no discernable role. There was also no statistically significant variation in butylenes over the range studied.

TABLE 4

Effect of Boehmite and $P_2O_5$ on Attrition and
Butylene Activity in Second Component

| Sample | Boehmite (wt %) | $P_2O_5$ (wt %) | AJI | AJAR | D50 | ZSA | SZSA | % ZSA retained |
|--------|------|------|------|-----|-----|-----|-----|-----|
| 1 | 4.50 | 12.73 | 8.8 | 2.0 | 91 | 143 | 126 | 88% |
| 2 | 3.50 | 12.09 | 18.9 | 4.4 | 84 | 142 | 127 | 90% |
| 3 | 5.50 | 10.46 | 7.1 | 1.6 | 87 | 159 | 121 | 76% |
| 4 | 4.50 | 10.99 | 8.0 | 1.8 | 87 | 153 | 124 | 81% |
| 5 | 5.50 | 11.58 | 6.0 | 1.3 | 83 | 156 | 126 | 80% |
| 6 | 3.50 | 10.16 | 17.4 | 4.0 | 87 | 153 | 123 | 81% |

Example 4: Preparing A Third Component

Particles containing 7 wt % boron oxide were prepared according to the process described in U.S. Pat. Nos. 9,796, 932 and/or 9,441,167 and/or U.S. Patent Application Publication No. US 2015/0174560, which are incorporated herein by reference in their entirety.

Example 5: Preparing A Fourth Component According to U.S. Pat. No. 9,637,688

A slurry consisting of a hydrous clay (UMF supplied by BASF Corporation), tetrasodium pyrophosphate clay dispersant (10 lb/ton) and water were made down to a kaolin solids content of 60% by weight using a high shear drill press mixer. This grade of kaolin is approximately 80% by weight finer than 2 microns. The slurry was screened to remove any agglomerates, and spray dried to a particle size similar to FCC catalyst (about 70 μm APS). The spray dried particles (which will be referred to as fourth matrix particles) were then calcined at a temperature above 1175° C. so that its mullite index was 35. BET surface area was 13 m²/gm, AP S=73 μm.

The fourth matrix particles were impregnated with a rare earth solution for a number of passes, as described in the Table below. The impregnated samples were dried overnight at 120° C. after each pass. The resulting sample was calcined at the temperatures and durations described in the Table below.

TABLE 5

Fourth Component Preparations

| Example | Fourth Matrix Amount (g) | Rare Earth Solution Type and Amount (g) | No. of Passes | Calcination Temp. and Duration | Final Rare Earth Concentration |
|---------|------|------|------|------|------|
| 1 | 4184 | 2476 g lanthanum nitrate solution | 2 | 400° C., 2 hours | 13.5 wt % of $La_2O_3$ |
| 2 | 4184 | 2476 g lanthanum nitrate solution | 2 | 500° C., 2 hours | 13.5 wt % of $La_2O_3$ |
| 3 | 2000 | 2836 g lanthanum nitrate solution | 4 | 400° C., 2 hours | 27.35 wt % of $La_2O_3$ |
| 4 | 1000 | 2091 g of lanthanum nitrate solution | 6 | 400° C., 2 hours | 35.7 wt % of $La_2O_3$ |
| 5 | 1500 | 1883 g of cerium nitrate | 4 | 400° C., 2 hours | 25 wt % $CeO_2$ |

Example 6: Effect of Beta Zeolite Composition on Total C5=Olefin Yield

Several FCC catalyst compositions were modeled to assess their C5=olefin activity. The FCC catalyst compositions and resulting yield projections are shown and summarized in Table 6. The results were computed based on a statistical model for ACE yields developed by systematically varying first component properties, second component and/ or ZSM-5 concentration, and dilution by inert components. Gasoline conversion was 70 wt %, the steamed zeolite surface area to matrix surface area ratio (Z/M) of the catalysts was 2.20, and the steamed unit cell size (SUCS) of the catalysts was 24.28 Å. Yields are given in weight percent, unless expressed as a ratio.

The yields include PIONA (paraffins, isoparaffins, olefins, naphthenes, aromatics) grouped analysis of the ACE liquid product only. Within the PIONA data are C5 olefins yields (excluding the cyclic C5 olefins), as well as octanes. While it is noted that this data was computed without the presence of Ni or V and without the catalyst composition including Ni or V passivators, it allows for a comparison of the effects of beta and ZSM-5 additives on a base catalyst formulation.

Increased amounts of beta zeolite resulted in an increase of total iso-olefins, with use of ZSM5 driving these totals down while driving aromatics and cyclic olefins up. The results also indicate an increase in total C5=olefin yield (i-C5=+n-C5=yield from PIONA analysis modeling) when compared to contacting the feed with an FCC catalyst composition that comprises Y zeolite without beta zeolite, as well as compared to contacting the feed with an FCC catalyst composition for which the second component is replaced with ZSM-5.

TABLE 6

| Yields Based on FCC Catalyst Composition | | | | | | | | | | | |
|---|---|---|---|---|---|---|---|---|---|---|
| | #1 | #2 | #3 | #4 | #5 | #6 | #7 | #8 | #9 | #10 | #11 |
| Beta (wt %) | 0.0 | 2.0 | 4.0 | 6.0 | 8.0 | 12.0 | 0.0 | 0.0 | 0.0 | 8.0 | 12.0 |
| ZSM-5 (wt %) | 0.0 | 0.0 | 0.0 | 0.0 | 0.0 | 0.0 | 2.0 | 4.0 | 6.0 | 2.0 | 6.0 |
| Yields | | | | | | | | | | | |
| Dry gas | 2.01 | 2.00 | 1.99 | 1.98 | 1.97 | 1.95 | 2.12 | 2.24 | 2.36 | 2.10 | 2.39 |
| Propane | 1.0 | 1.0 | 1 C | 1.0 | 1.0 | 1.1 | 1.3 | 1.5 | 1.5 | 1.3 | 1.6 |
| Propylene | 5.3 | 5.4 | 5.4 | 5.5 | 5.6 | 5.7 | 7.3 | 8.7 | 9.5 | 7.6 | 10.2 |
| C3=/TC3 | 0.83 | 0.83 | 0.83 | 0.83 | 0.83 | 0.84 | 0.85 | 0.86 | 0.86 | 0.85 | 0.87 |
| TC4= | 6.94 | 6.97 | 7.03 | 7.14 | 7.27 | 7.65 | 7.84 | 8.50 | 8.92 | 8.17 | 9.63 |
| TC4=/TC4 | 0.60 | 0.59 | 0.59 | 0.59 | 0.60 | 0.61 | 0.60 | 0.61 | 0.61 | 0.60 | 0.63 |
| iC4=/iC4 | 0.56 | 0.55 | 0.55 | 0.56 | 0.58 | 0.64 | 0.59 | 0.63 | 0.67 | 0.62 | 0.75 |
| TC4=/C3= | 1.33 | 1.34 | 1.34 | 1.34 | 1.34 | 1.35 | 1.11 | 0.98 | 0.94 | 1.12 | 0.96 |
| LPG | 17.8 | 18.0 | 18.2 | 18.4 | 18.7 | 19.1 | 21.6 | 24.2 | 25.7 | 22.4 | 27.0 |
| Gasoline (C5 to 430° F.) | 48.1 | 47.9 | 47.6 | 47.4 | 47.2 | 46.7 | 44.2 | 41.4 | 39.8 | 43.3 | 38.4 |
| LCO (430 to 650° F.) | 17.8 | 17.8 | 17.8 | 17.7 | 17.7 | 17.6 | 17.8 | 17.7 | 17.7 | 17.6 | 17.4 |
| Bottoms (650+ above) | 12.2 | 12.2 | 12.2 | 12.3 | 12.3 | 12.4 | 12.2 | 12.3 | 12.3 | 12.4 | 12.6 |
| Coke | 2.105 | 2.1 | 2.1 | 2.1 | 2.1 | 2.1 | 2.1 | 2.1 | 2.1 | 2.1 | 2.1 |
| LPG Sats. | 5.7 | 5.8 | 5.9 | 5.9 | 5.9 | 5.9 | 6.5 | 7.1 | 7.3 | 6.8 | 7.3 |
| Butylenes | 6.9 | 7.0 | 7.1 | 7.2 | 7.3 | 7.6 | 7.8 | 8.5 | 8.9 | 8.2 | 9.6 |
| Delta Butylenes | 0.00 | 0.06 | 0.14 | 0.24 | 0.37 | 0.70 | 0.87 | 1.54 | 1.99 | 1.25 | 2.69 |
| i-C5= + n-C5= (PIONA) | 3.09 | 3.09 | 3.10 | 3.10 | 3.11 | 3.12 | 2.97 | 2.86 | 2.75 | 2.99 | 2.78 |
| PIONA | | | | | | | | | | | |
| total naph. | 8.95 | 8.89 | 8.83 | 8.77 | 8.70 | 8.58 | 9.43 | 9.62 | 9.52 | 9.19 | 9.14 |
| total i-par | 12.46 | 12.28 | 12.11 | 11.93 | 11.76 | 11.41 | 11.40 | 11.14 | 11.69 | 10.70 | 10.64 |
| total n-par | 2.18 | 2.21 | 2.23 | 2.24 | 2.23 | 2.18 | 1.92 | 1.78 | 1.74 | 1.97 | 1.75 |
| total cyclic olefins | 9.30 | 9.27 | 9.32 | 9.43 | 9.61 | 10.19 | 10.37 | 11.08 | 11.44 | 10.69 | 12.33 |
| total i-olefin | 16.02 | 16.23 | 16.44 | 16.65 | 16.86 | 17.28 | 14.01 | 12.60 | 11.79 | 14.69 | 12.35 |
| total n-olefin | 6.81 | 6.80 | 6.79 | 6.78 | 6.77 | 6.75 | 5.51 | 4.67 | 4.30 | 5.47 | 4.24 |
| total aromatics | 40.89 | 40.89 | 40.89 | 40.89 | 40.89 | 40.89 | 46.04 | 49.67 | 51.75 | 46.04 | 51.75 |
| other | 0.33 | 0.33 | 0.33 | 0.33 | 0.33 | 0.33 | 0.37 | 0.42 | 0.46 | 0.37 | 0.46 |
| benzene | 0.51 | 0.52 | 0.53 | 0.54 | 0.54 | 0.56 | 0.67 | 0.78 | 0.87 | 0.70 | 0.91 |
| i-C5= | 1.87 | 1.88 | 1.89 | 1.89 | 1.90 | 1.92 | 1.85 | 1.82 | 1.80 | 1.88 | 1.85 |
| i-C6= | 4.98 | 5.04 | 5.12 | 5.22 | 5.34 | 5.65 | 4.75 | 4.53 | 4.31 | 5.06 | 4.70 |
| i-C7= | 4.09 | 4.14 | 4.19 | 4.24 | 4.28 | 4.38 | 3.08 | 2.46 | 2.23 | 3.23 | 2.32 |
| i-C8= | 2.56 | 2.57 | 2.58 | 2.59 | 2.60 | 2.61 | 2.11 | 1.77 | 1.54 | 2.15 | 1.59 |
| n-C4= | 0.12 | 0.09 | 0.06 | 0.05 | 0.04 | 0.04 | 0.15 | 0.18 | 0.21 | 0.05 | 0.07 |
| n-C5= | 1.22 | 1.22 | 1.21 | 1.21 | 1.21 | 1.20 | 1.13 | 1.04 | 0.94 | 1.11 | 0.92 |
| n-C6= | 2.30 | 2.34 | 2.37 | 2.40 | 2.44 | 2.50 | 1.99 | 1.76 | 1.63 | 2.10 | 1.74 |
| n-C7= | 1.33 | 1.33 | 1.33 | 1.33 | 1.33 | 1.33 | 0.87 | 0.59 | 0.49 | 0.87 | 0.49 |
| n-C8= | 0.68 | 0.67 | 0.67 | 0.66 | 0.66 | 0.64 | 0.46 | 0.32 | 0.25 | 0.45 | 0.24 |
| RON | 94.56 | 94.72 | 94.89 | 95.05 | 95.21 | 95.53 | 96.16 | 97.29 | 97.97 | 96.80 | 98.93 |
| MON | 78.99 | 79.04 | 79.09 | 79.14 | 79.19 | 79.28 | 80.00 | 80.83 | 81.48 | 80.19 | 81.77 |
| Wt % Benzene | 0.58 | 0.59 | 0.60 | 0.61 | 0.62 | 0.63 | 0.75 | 0.87 | 0.95 | 0.78 | 1.00 |
| Wt % Toluene | 4.92 | 4.92 | 4.93 | 4.93 | 4.93 | 4.93 | 5.73 | 6.26 | 6.50 | 5.74 | 6.51 |
| (R + M)/2 | 86.86 | 86.94 | 87.01 | 87.09 | 87.16 | 87.31 | 88.17 | 89.15 | 89.81 | 88.47 | 90.27 |

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

The present disclosure has been described with reference to specific exemplary embodiments thereof. The specification and drawings are, accordingly, to be regarded in an illustrative rather than a restrictive sense. Various modifications of the disclosure in addition to those shown and described herein will become apparent to those skilled in the art and are intended to fall within the scope of the appended claims.

The invention claimed is:

1. A fluid catalytic cracking (FCC) catalyst composition comprising:
   a first component comprising Y zeolite and a first matrix, the first matrix comprising clay, rare-earth-doped alumina, silica-alumina, silica-doped alumina, χ-alumina, δ-alumina, θ-alumina, κ-alumina, boehmite, spinel, mullite, or a combination of any two or more thereof, wherein the first matrix further comprises a metal passivating constituent comprising a transitional alumina, the first component comprising 1 wt % to 80 wt % of the transitional alumina based on total weight of the first component; and
   a second component comprising beta zeolite and oxidized phosphorus and a second matrix comprising non-zeolitic material;
   wherein a weight ratio of the first component to the second component in the FCC catalyst composition ranges from 1.5:1 to about 20:1.

2. The FCC catalyst composition of claim 1, further comprising at least one additional component that is compositionally different from the first component and from the second component, wherein the at least one additional component comprises boron oxide, metal trap comprising a rare earth oxide dispersed within an inert material, or a combination thereof.

3. The FCC catalyst composition of claim 2, wherein the at least one additional component further comprises a zeolite selected from the group consisting of ZSM-5, mordenite, ferrierite, MCM-22, MCM-68, Y zeolite, beta zeolite, and a combination thereof.

4. The FCC catalyst composition of claim 3, wherein the at least one additional component comprises the metal trap.

5. The FCC catalyst composition of claim 4, wherein the rare-earth oxide comprises lanthanum oxide in an amount of at least about 5 wt %, based on total weight of the metal trap.

6. The FCC catalyst composition of claim 4, wherein the inert material has a mullite content of at least about 15 wt %.

7. The FCC catalyst composition of claim 1, wherein the Y zeolite in the first component comprises at least about 15 wt % Y-faujasite crystallized in-situ from a metakaolin-containing calcined microsphere, and wherein the first matrix comprises alumina obtained by the calcination of a dispersible boehmite contained in the microsphere.

8. The FCC catalyst composition of claim 1, wherein the first matrix comprises at least about 5 wt % of the transitional alumina in a combination of gamma phase and delta phase, that has been obtained by the calcination of a dispersible boehmite.

9. The FCC catalyst composition of claim 1, wherein the second component comprises $AlPO_4$ formed from boehmite and phosphoric acid, at an amount of about 1 wt % to about 25 wt %, based on total weight of the second component.

10. The FCC catalyst composition of claim 1, wherein the second component is substantially free of transitional alumina.

11. The FCC catalyst composition of claim 1, wherein the second matrix comprises kaolin.

12. The FCC catalyst composition of claim 1, wherein the silica to alumina ratio (SAR) in the beta zeolite ranges from about 20 to about 300.

13. The FCC catalyst composition of claim 1, wherein the zeolite surface area (ZSA) of the second component ranges from about 50 $m^2/g$ to about 300 $m^2/g$.

14. The FCC catalyst composition of claim 1, wherein the steamed zeolite surface area (SZSA) of the second component ranges from about 50 $m^2/g$ to about 300 $m^2/g$ after steaming in 100% steam at 1450° F. for 24 hours, and wherein at least about 65% of the ZSA of the second component is maintained after steaming in 100% steam at 1450° F. for 24 hours.

15. The FCC catalyst composition of claim 1, wherein the Brönsted acidity of the second component ranges from about 10 μmol/g to about 65 μmol/g, and wherein the air jet attrition rate (AJAR) of the second component is less than about 5 wt %/hr.

16. The FCC catalyst composition of claim 1, further comprising at least one additional component comprising a boron oxide component, wherein the boron oxide component comprises a third matrix and boron oxide, and
   wherein the third matrix is selected from the group consisting of kaolinite, halloysite, montmorillonite, bentonite, attapulgite, kaolin, amorphous kaolin, metakaolin, mullite, spinel, hydrous kaolin, clay, gibbsite (alumina trihydrate), boehmite, titania, alumina, silica, silica-alumina, silica-magnesia, magnesia, sepiolite, and a combination thereof.

17. The FCC catalyst composition of claim 1, wherein the non-zeolitic material includes boehmite alumina and kaolin.

18. A method of making the fluid catalytic cracking (FCC) catalyst composition of claim 1, the method comprising blending the first component and the second component.

19. A method of cracking a hydrocarbon feed, the method comprising contacting the feed with the FCC catalyst composition of claim 1.

20. A fluid catalytic cracking (FCC) catalyst composition comprising:
   a first component comprising Y zeolite and a first matrix, the first matrix comprising clay, rare-earth-doped alumina, silica-alumina, silica-doped alumina, χ-alumina, δ-alumina, θ-alumina, κ-alumina, boehmite, spinel, mullite, or a combination of any two or more thereof, wherein the first matrix further comprises a nickel and/or vanadium passivating constituent; and
   a second component comprising beta zeolite and oxidized phosphorus and a second matrix comprising non-zeolitic material;
   wherein a weight ratio of the first component to the second component in the FCC catalyst composition ranges from 1.5:1 to about 20:1.

21. The FCC catalyst composition of claim 20, wherein the nickel and/or vanadium passivating constituent comprises a transitional alumina in combination of gamma phase and delta phase that has been obtained by the calcination of a dispersible boehmite, the first component comprising 1 wt % to 80 wt % of the transitional alumina based on total weight of the first component.

* * * * *